(12) United States Patent
Doherty et al.

(10) Patent No.: US 6,920,567 B1
(45) Date of Patent: Jul. 19, 2005

(54) SYSTEM AND EMBEDDED LICENSE CONTROL MECHANISM FOR THE CREATION AND DISTRIBUTION OF DIGITAL CONTENT FILES AND ENFORCEMENT OF LICENSED USE OF THE DIGITAL CONTENT FILES

(75) Inventors: Robert J. Doherty, Medway, MA (US); Peter L. Tierney, Arlington, MA (US); Marios Arnaoutoglou-Andreou, Boston, MA (US)

(73) Assignee: Viatech Technologies Inc., Natick, MA (US)

( * ) Notice: Subject to any disclaimer, the term of this patent is extended or adjusted under 35 U.S.C. 154(b) by 0 days.

(21) Appl. No.: 09/544,682

(22) Filed: Apr. 7, 2000

Related U.S. Application Data
(60) Provisional application No. 60/128,152, filed on Apr. 7, 1999.

(51) Int. Cl.[7] .............................. G06F 9/00; G06F 7/00
(52) U.S. Cl. ...................... 713/202; 707/104; 713/182; 713/194; 713/171; 713/168
(58) Field of Search ................................. 713/200, 202, 713/182, 194, 168, 171; 707/104

(56) References Cited

U.S. PATENT DOCUMENTS

| | | | | |
|---|---|---|---|---|
| 5,204,897 A | * | 4/1993 | Wyman | 710/200 |
| 5,438,508 A | * | 8/1995 | Wyman | 705/8 |
| 5,634,012 A | * | 5/1997 | Stefik et al. | 705/39 |
| 5,715,403 A | * | 2/1998 | Stefik | 705/44 |
| 5,973,692 A | * | 10/1999 | Knowlton et al. | 345/835 |
| 6,389,538 B1 | * | 5/2002 | Gruse et al. | 713/194 |

* cited by examiner

Primary Examiner—Norman M. Wright
(74) Attorney, Agent, or Firm—Davis & Bujold, P.L.L.C.

(57) ABSTRACT

A digital content file including a license control mechanism controlling the licensed use of digital content and a system and method for distributing licensable digital content files and licenses. A digital content file includes a digital content, which may be executable code or data, an embedded file access control mechanism and a dynamic license database associated with the file access mechanism for storing license information used by the file access control mechanism in controlling use of the digital content. The file access control mechanism includes a license monitor and control mechanism communicating with the dynamic license database and controlling use of the digital content and a license control utility providing communications between a user system and an external system to communicate license definition information and includes a graphical user interface. License information may be stored initially in the dynamic license database or provided from an external system. The system allows the distribution of digital content files and the acquisition of licenses with seamless transaction processing through an order processing system generating an order identification and authorization for a license and a product configuration and order database containing license management databases associated with the digital content files and containing license information to be transmitted to a user system upon receipt of an order identifier. The product configuration and order database also generates a license record for each transaction.

32 Claims, 7 Drawing Sheets

SYSTEM AND EMBEDDED LICENSE CONTROL MECHANISM FOR THE CREATION AND DISTRIBUTION OF DIGITAL CONTENT FILES AND ENFORCEMENT OF LICENSED USE OF THE DIGITAL CONTENT FILES

CROSS REFERENCES TO RELATED APPLICATIONS

The present application claims the benefit of U.S. Provisional Application No. 60/128,152, filed Apr. 7, 1999, now abandoned, by the same inventors as the present application and directed to and disclosing the same invention as the present application.

FIELD OF THE INVENTION

The present invention relates to a method and apparatus for controlling the use of files containing digital content, such as computer programs and data and digitally formatted audio and image information, and, more specifically, for a system and license control mechanism for use in creating and distributing files containing digital content and for enforcing the licensed use of digital content files.

BACKGROUND OF THE INVENTION

A recurring problem in computer systems is the distribution of licensed digital content files, such as programs and data files, and the subsequent control of the licensed use of such digital content files, and this problem has become significantly more severe with the advent of the networked purchase and distribution of licensed digital content files through, for example, the Internet.

The prior art has attempted a number of solutions to this problem. For example, in one system of the prior art a licensed program is bundled with a file manager program that interacts with the target system operating system to monitor file calls to the licensed program. A part of the licensed program is encrypted to reversibly disable a part of the program and the file manager program permits access to only the unencrypted parts of the program until a user presents a product key that is distributed separately from the program distributor. The product key is based, in part, on the user system hardware configuration and, when presented to the file manager, permanently decrypts and unlocks the licensed program for full access by the user. This system, however, distributes licensed programs on computer media and the protection mechanism operates on a media basis, that is, protects all programs on a media rather than protecting the programs individually. In addition, the system uses a file management program that must interact with the user operating system to monitor user system file input/output calls to restrict access to a licensed program, and must separately provide a product key to fully access the program. The system also requires the use of import and export modules to transfer a licensed program and product key information from one system to another, thereby limiting the means by which a program and license may be distributed. A further problem is that the system utilizes a file based encryption scheme that uses built-in data, relating only to a product code, to determine whether to remove the encryption protection, and provides only on/off encryption protection for a licensed program wherein the protection, once removed by the use of a product key, cannot be restored. Also, the license may not be transferred from one user or system to another.

In another system of the prior art, access to a licensed program is dependent upon a key that combines identifications of an enterprise system comprised of a plurality of computer systems, a computer system within the enterprise system, and an identifier of the licensed program that is tied to the enterprise system, wherein the identifiers are typically system serial numbers. Use of a licensed program is controlled by a license manager resident in the enterprise system that accepts the keys and grants access to licensed programs to the computer system of the enterprise system computers based upon keys identifying the computers as members of the enterprise system. The license manager is activated by operation of an enterprise enabler program that, in turn, requires a key specific to the enterprise system. This system, however, requires the user to be a member of an enterprise system, thereby severely limiting the applicability of the system, and is dependent upon license checking functions that are independent of and separate from the licensed program, and thus have no effective functional relationship to the licensed program, and provides only a fixed, static form of license.

Yet another system of the prior art distributes licensed programs in locked "containers" and requires the issuance of an authentication certificate and a decryption key that are used by the user to access the licensed program. The system is thereby based upon the use of an authentication certificate transmitted from a license clearing house to a user system, and that thereby has no functional relationship to the licensed program. Another disadvantage of this system is that the only trusted entity in the distribution chain to the user is the license clearing house, so that no other entity in a distribution chain is capable of affecting the authentication of a user, thereby severely limiting the means by which the programs may be distributed. In addition, the system provides only a single, yes/no level of authentication and the program is protected only until an authentication certificate is used to unlock the encryption protection, whereupon the program thereafter is unprotected.

Still another system of the prior art provides a software license management system for software packages containing a plurality of components, each of which is a software product such as an application program. A license server creates a license database from a package license description that includes software product licenses and will grant a license to a software product to a user system upon a request from a user that meets the constraints of the package license description, which are primarily limitations on the number of licenses that may be granted. Each grant of a software product license results in the creation of a license record in the database wherein each license record includes an exclusive suite license to the software package that includes the requested software product, so that licenses are effectively granted to the software packages rather than to the individual components of the software packages. Again, this system protects a package of products, rather than the products themselves, and requires a license server that is separate from the user systems to receive license requests and to issue licenses and to enforce the license restrictions, which further requires that all license records reside in the license server. In addition, the licenses are static, that is, cannot be subsequently modified, and once a license is granted a program is fully accessible to the user system, even given significant changes to the user system or user.

Yet another system of the prior art provides a software license management system for programs wherein a license server maintains a database of licenses created from a license document provided from a license issuer. Each licensed program makes a call to the license server upon program start-up and the license server checks whether use of the program is permitted under the licenses stored in the license database, using such parameters as node, login domain, user name, product name, operation system, operating domain and type of processor. The license server will issue a grants for use of the program, if such use is permitted, and will allow a user on one node of the system to execute a program residing on another node of the system be means of a "calling card" identification of the user whereby the user obtains permission to make a procedure call to use the program on the other node of the system.

Another system of the prior art provides a software/license metering system that is based upon the use of a system monitor implemented in hardware and software to monitor and track the usage of one or more software products and certain user system parameters. Yet another provides a license management system for use in the nodes of a network wherein authorization to use a program is based upon licenses stored in the nodes of the network and the use of programs is controlled by limiting the number of valid licenses on the network. A related system of the prior art provides a software management system wherein a plurality of different types of licenses are available to a user on a local node at the time the user requests a license. The management system may select among a local node-locked license, a floating license or a remote node-locked license, wherein in the latter case the user is connected to the remote node, or may place the user request in a request queue if no license is currently available. Yet another system a system provides for the per-use decryption of confidential data files and the subsequent elimination of the decrypted data by scorching or selective re-encryption. The decision whether to re-encrypt a given decrypted file is based upon file or application program exclusion lists, file open and close requests, identification of confidential files by directory, tracking of the number of application programs using a file, and identification of non-modified text.

It is apparent, therefore, that the systems of the prior art suffer from a number of disadvantages. For example, the systems of the prior art generally rely upon mechanisms that are separate and independent from a licensed program, rather than a means that is related to the program itself, thereby providing only limited protection and being readily vulnerable to various methods for bypassing such forms of protection. In addition, the systems of the prior art are essentially static, that is, they do not allow a license to be subsequently modified at need, and frequently provide only one-time protection. Also, the systems of the prior art severely limit the types of systems in which the programs and licensing enforcement mechanisms may be employed, and the means by which the licensed programs and licenses may be distributed.

The present invention provides a solution to these and other problems of the prior art.

SUMMARY OF THE INVENTION

The present invention is directed to a digital content file including a license control mechanism and a system and method for distributing licensable digital content files, providing licenses for digital content files, and controlling the licensed use of digital content.

According to the present invention, a licensable digital content file includes a digital content and a file access control mechanism embedded in the digital content file and a dynamic license database associated with the digital content file for storing information controlling operations of the file access control mechanism and license information controlling licensed use of the digital content. The file access control mechanism includes a license functions mechanism wherein the license functions mechanism includes a license monitor and control mechanism communicating with a dynamic license database and monitoring use of the digital content by a user to determine whether a use of the digital content by a user complies with the license defined in the dynamic license database and a license control utility providing communications between a user system and an external system to communicate license definition information between the user system and the external system, including a graphical user interface associated with the license control utility to provide communication between a user and user accessible functions of the license functions mechanism.

The information contained in the dynamic license database and controlling licensed use of the digital content includes user accessible information defining a license available to a user and controlling use of the digital contents by the user and may include license purchase information defining the terms of purchase of at least one license available to a user. In the latter case, the license control utility and license monitor and control mechanism are responsive to user input through the graphical user interface for accessing the purchase information in the dynamic license database, accessing the user system to obtain system information identifying the user system in which the digital content is to be used, communicating purchase information for a license selected from the at least one license defined therein to an external system, receiving from the external system license information corresponding to the purchase information, and writing the license information into the dynamic license database for use by the license monitor and control mechanism in controlling licensed use of the digital content by the user.

In an alternate implementation, the license information contained in the dynamic license database for controlling licensed use of the digital content further defines license conditions for use of the digital content in a user system. In this implementation, the license control utility and license monitor and control mechanism are responsive to user input through the graphical user interface requesting activation of the license defined in the dynamic license database for accessing the user system to obtain system information identifying the user system in which the digital content is to be used, confirming that the system information and user request for activation of the license defined in the dynamic license database complies with the license defined in the dynamic license database, writing the system information into the dynamic license database to be part of the license information contained in the dynamic license database for controlling licensed use of the digital content, and activating the license defined in the dynamic license database.

When license information defining a license is resident in the dynamic license database, the license monitor and control mechanism is responsive to an attempt by a user system to access the digital content for comparing information obtained from the user system regarding use of the digital content and allowed uses of the digital content as defined by the license information residing in the dynamic license database and determining whether a use of the digital content by a user complies with the license defined in the dynamic license database.

According to the present invention, and by operation of the file access control mechanism, the information contained in the dynamic license database and controlling licensed use of the digital content can be accessed only through the license monitor and control mechanism embedded in the digital content file, and the digital content can be accessed only through license functions mechanism embedded in the digital content file.

The license information residing in the dynamic license database also includes system fingerprint information identifying a user system on which the digital contents are licensed for use, and the license functions mechanism further includes an adaptive fingerprint security mechanism responsive to an attempted access of the digital contents for obtaining current system fingerprint information from the user system and comparing the current system fingerprint information with the system fingerprint information in the dynamic license database. The license monitor and control mechanism is responsive to a comparison of the current system fingerprint information with the system fingerprint information in the dynamic license database to allow the user system to access the digital content when the current system fingerprint information compares with the system fingerprint information in the dynamic license database to within a predetermined range of tolerance. In a further embodiment of the present invention, the license monitor and control mechanism is responsive to a comparison of the current system fingerprint information with the system fingerprint information in the dynamic license database when the current system fingerprint information compares with the system fingerprint information in the dynamic license database to within a predetermined range of tolerance for writing the current system fingerprint information into the dynamic license database in replacement of the system fingerprint information previously stored in the dynamic license database.

Also according to the present invention, the digital content may include executable code or digital data and the digital data may include media data, such as music data or video data. In the case of media data to be presented to a user through a media player, the system fingerprint information may includes authorized media players and the license monitor and control mechanism may be responsive to a comparison of current system fingerprint information identifying a media player accessible by the user system with the system fingerprint information in the dynamic license database identifying authorized media players to allow the user system to access the media data when the current system fingerprint information identifies a media player registered as an authorized media player in the system fingerprint information in the dynamic license database.

The present invention further includes a method for constructing a digital content file to be installed in a user system wherein the digital content file includes an embedded file access control mechanism for controlling the licensed use of digital content and wherein the digital content of the digital content file includes executable code. This method includes the steps of generating a reconstructed executable code by extracting from the executable code information identified as critical and necessary to the execution of the executable code and inserting links to a wrapper dynamic linked library wherein the wrapper dynamic linked library includes a control dynamic linked library containing control functions for the display and behavior of options for license purchase and generation and a main dynamic linked library including a license functions mechanism and the extracted information identified as critical and necessary to execution of the executable code. The method then includes the steps of generating an encrypted reconstructed executable code by encrypting the executable code of the reconstructed executable code and the links inserted into the reconstructed executable code, generating an encrypted wrapper dynamic linked library by encrypting the wrapper dynamic linked library, and constructing a product installer by combining the encrypted reconstructed executable code, the encrypted wrapper dynamic linked library, a dynamic license database, and a license decrypt/extraction mechanism, wherein the product installer is distributed to a user system.

The present invention further includes a method for installing a digital content file in a user system wherein the digital content file resides in a product installer and includes an embedded file access control mechanism for controlling the licensed use of digital content, a dynamic license database for storing information controlling operations of the file access control mechanism and use of the digital content and wherein the digital content of the digital content file includes executable code. According to the present invention, the installation method includes the steps of decrypting and extracting the contents of an encrypted wrapper dynamic linked library wherein the dynamic linked library includes a control dynamic linked library containing control functions for the display and behavior of options for license purchase and generation and a main dynamic linked library that includes a license functions mechanism and extracted information extracted from the executable code as identified as critical and necessary to execution of the executable code. The method of the present invention then includes the steps of storing the license functions mechanism in the user system, determining whether the dynamic license database contains information defining a license controlling use of the digital content in the user system. When the dynamic license database does not contain information defining a license controlling use of the digital content, the method includes executing operations defined by information in the dynamic license database and controlling operations of the file access control mechanism for obtaining license information defining a license controlling use of the digital content in the user system. When the dynamic license database contains information defining a license controlling use of the digital content, the method includes executing operations defined by information in the dynamic license database and controlling operations of the file access control mechanism for obtaining license information defining a license controlling use of the digital content in the user system. Thereafter, the method includes decrypting and extracting the contents of an encrypted reconstructed executable code wherein the encrypted reconstructed executable code includes executable code of the digital content containing links to the wrapper dynamic linked library, and storing the executable code of the digital content in the user system.

In a further embodiment of the method for installing a digital content file, the license functions mechanism is stored in the user system using a randomly generated file name and the dynamic license database may be stored in the user system using a randomly generated file name.

A method for accessing the digital content of a digital content file in a user system wherein the digital content includes executable code includes the steps of intercepting an attempt to access the digital content and validating licensed access of the digital content by determining whether a dynamic license database associated with the file access control mechanism contains license information defining a license controlling user of the digital contents, determining whether the user system complies with a license defined by license information contained in the dynamic license database, and when the user system complies with a license defined by license information contained in the dynamic license database, allowing access to the executable code and to information extracted from the executable code and stored in a main dynamic linked library associated with the file access control mechanism.

The present invention also includes a method for constructing a digital content file to be installed in a user system wherein the digital content file includes an embedded file access control mechanism for controlling the licensed use of digital content and wherein the digital content of the digital content file includes data. This method includes the steps of generating an encrypted contents by encrypting the digital contents, generating an encrypted products information containing information used in obtaining license information controlling use of the digital contents, generating a digital content file containing the encrypted contents and the encrypted products information and generating an encrypted digital content file by encrypting the digital content file, and generating an installable executable containing the encrypted digital content file and an embedded file access control mechanism including a decrypting mechanism with an associated dynamic license database that is associated with the file access control mechanism for storing information controlling operations of the file access control mechanism and license information controlling licensed use of the digital content.

A digital content file contained in an installable executable containing an encrypted digital content file and an embedded file access control mechanism including a decrypting mechanism may then be installed by executing the installable executable to store the file access control mechanism and the encrypted digital content file in the user system. Thereafter, the file access control mechanism is invoked to determine whether the dynamic license database contains information defining a license controlling use of the digital content in the user system, and when the dynamic license database does not contain information defining a license controlling use of the digital content, the file access control mechanism executes operations defined by information in the dynamic license database and controlling operations of the file access control mechanism for obtaining license information defining a license controlling use of the digital content in the user system.

The digital content of a digital content file in a user system wherein the digital content file wherein the digital content includes data contained in an encrypted digital content file and the digital content file includes an embedded file access control mechanism including a decrypting mechanism may be accessed by the process of, in the file access control mechanism, intercepting an attempt to access the digital content and validating licensed access of the digital content by determining whether a dynamic license database associated with the file access control mechanism contains license information defining a license controlling user of the digital contents. When the dynamic license database contains information defining a license controlling use of the digital content the file access control mechanism decrypts the encrypted product information contained in the encrypted digital content file and determines whether the user system complies with a license defined by license information contained in the dynamic license database, and when the user system complies with a license defined by license information contained in the dynamic license database, decrypts the digital contents from the encrypted digital content file and providing the digital contents to the user system.

In certain applications of the method for controlling access to a digital content file containing data, such as media data, the user system may include an application, such as a media player, that is designated to access at least one designated type of digital content file.

In this embodiment, the file access control mechanism includes a monitor to intercept attempts to open digital content files of the at least one designated type by the application and to invoke the file access control mechanism to execute the steps for validating licensed access of the digital content.

The present invention further includes a method for distributing a digital content file including a license control mechanism for controlling the licensed use of digital content of the digital content file to user systems. The distribution method includes the steps of preparing a licensable digital content file containing a digital content, an embedded file access control mechanism that includes a license functions mechanism including a license monitor and control mechanism, an adaptive fingerprint security mechanism and a license control utility including a graphical user interface, and a dynamic license database wherein the dynamic license database initially associated with the licensable digital content file contains initial license information defining the requirements for at least one license that may be obtained by a user of a user system. The licensable digital content file is provided to a user system through a distribution mechanism and in the user system the file access control mechanism accesses the initial license information in the dynamic license database to determine the requirements for the at least one license that may be obtained by a user of the user system including accessing the user system to obtain system fingerprint information identifying the user system in which the digital content is to be used. The file access control mechanism then executes the requirements defined in the initial license information to obtain license information defining a license allowing use of the digital contents, and writes the license information and system fingerprint information into the dynamic license database for use by the license monitor and control mechanism in controlling licensed use of the digital content by the user.

The distribution method may also include the steps of configuring a license management database to be associated with the licensable digital content file and containing license information for controlling use of the digital content file in compliance with a license defined by the license information and storing the license management database in a product configuration and order database. The step of executing the requirements defined in the initial license information to obtain license information defining a license allowing use of the digital contents may then include the steps of invoking the file access control mechanism to generate a request for a license containing user system information, including system fingerprint information and providing the request to the product configuration and order database. The product configuration and order database then reads the license management database corresponding to the digital content file and request and generating license information defining a license for use of the digital content in the user system and provides the license information defining a license for use of the digital content in the user system to the user system, wherein the file access control mechanism writes the license information into the dynamic license database to define a license for use of the digital content in the user system.

The present invention is also directed to a method and system providing a license for use of digital content in a digital content file residing in a user system with seamless order processing for licenses wherein the digital content file includes an embedded file access control mechanism for controlling the licensed use of digital content of the digital content file. According to the present invention the method and system include the generation of a purchase request for a license by the file access control mechanism wherein the request contains user system information, including system fingerprint information, and financial information relating to the purchase of a license, and the providing of the request to an order processing system by the file access control mechanism. The order processing system generates an order identification and authorization for a license and provides the order identification and authorization and the purchase request to a product configuration and order database containing at least one license management database associated with the digital content file and containing license information for controlling use of the digital content file in compliance with a license defined by the license information. The product configuration and order database reads the license management database corresponding to the digital content file, generates license information defining a license for use of the digital content in the user system, generates a license record, and provides the license information defining a license for use of the digital content in the user system to the user system. The file access control mechanism then writes the license information into the dynamic license database to define a license for use of the digital content in the user system.

BRIEF DESCRIPTION OF THE DRAWINGS

The foregoing and other objects, features and advantages of the present invention will be apparent from the following description of the invention and embodiments thereof, as illustrated in the accompanying figures, wherein.

DETAILED DESCRIPTION OF THE INVENTION

Figure 1A:
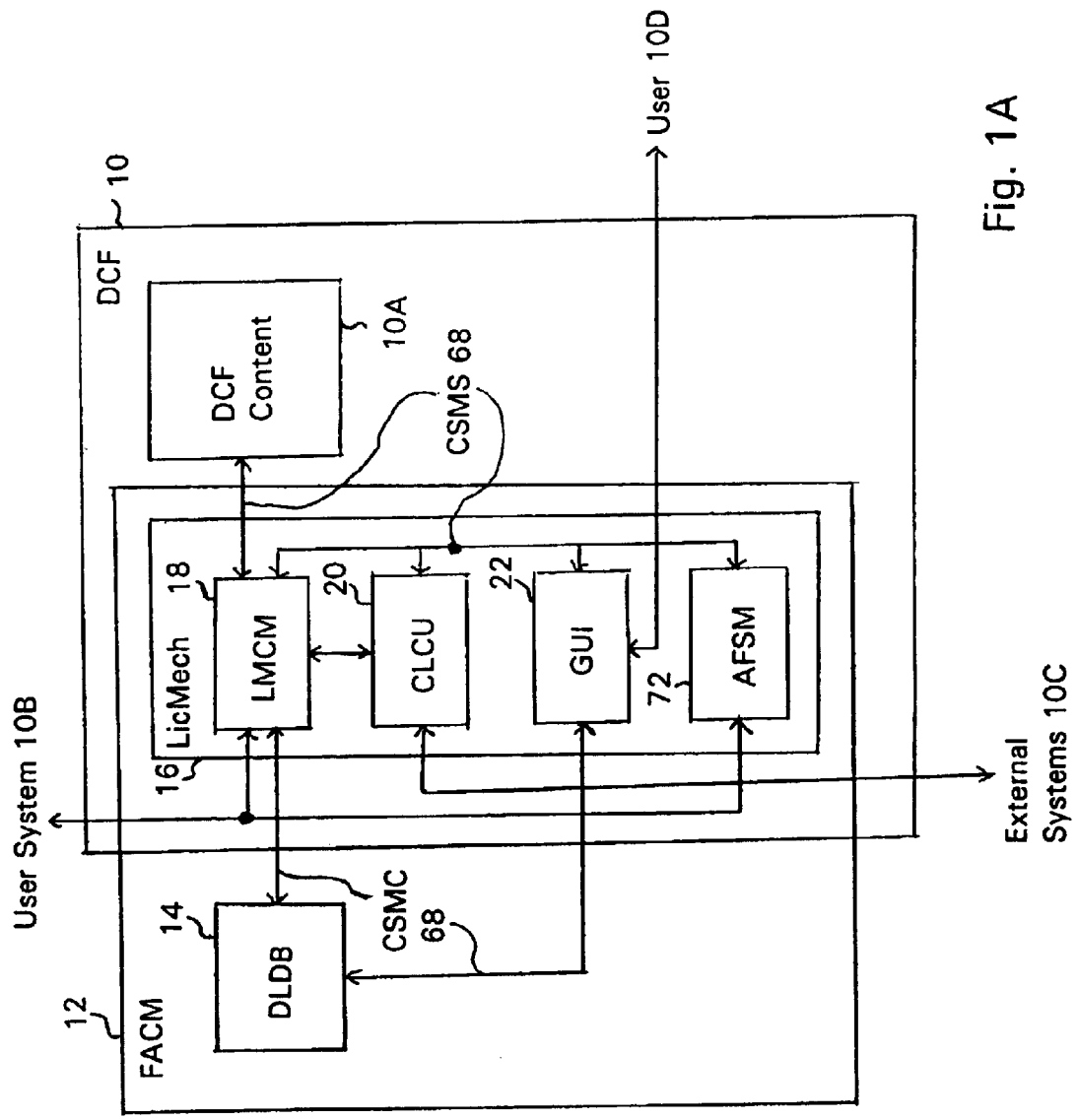
FIGS. 1A, 1B, 1C and 1D are diagrammatic representations of a file containing licensed digital content and an electronic license mechanism embedded therein according to the present invention.

A. Introduction (FIG. 1A)

As described above, the present invention is an electronic licensing (eLicense) system that includes an electronic license (eLicense) file control mechanism for use in creating and distributing files containing digital content, such as computer programs and data and information of all forms, subject to the provisions and terms of a license and for enforcing the terms and provisions of the license. As will be described in the following, the licensing system and license control mechanisms of the present invention may be used in applications such as electronic delivery of software via the Internet, e-commerce technologies for selling software, delivery of usage authorization for software which is distributed by non-electronic means, and software asset management within an enterprise. In addition to computer programs and data files, the present system and embedded file access control mechanism may be used in a similar manner in the delivery and control of products containing digitally formatted audio and image information, such as audio and video files, music and movies, through similar channels.

As will also be described, the present invention may be embodied in a variety of implementations to make optimum use of user system resources or characteristics, such as by means of code-embedded or digital wrapper implementations. The present invention may be readily integrated with existing implementations of electronic commerce (e-commerce) and distribution methods, or in systems embodying turnkey implementations of the present invention.

The eLicense control mechanism of the present invention is created, stored, accessed, and displayed on the end user's system and provides a resident database for storing, referencing, and updating digital content file and license data for a digital content file that has been licensed through the incorporation of the license control mechanism of the present invention, a mechanism for protecting the contents of a digital content file contents from tampering, unauthorized copying, and so forth, a secure mechanism for communicating with the eLicense data defining the license, facilities to view and query information about the digital content file and the contents of the digital content file, and facilities to manipulate the eLicenses for desired, permitted operations.

As illustrated in FIG. 1A and as described in detail in the following, each DCF 10 that is created or distributed according to the present invention includes the digital data or executable code contents of the DCF 10, indicated as DCF Contents 10A, and an integral File Access Control Mechanism (FACM) 12 that controls access to the contents of the file according to the terms, provisions and restrictions of an electronic license (eLicense) embodied and implemented in the FACM 12. As shown in FIG. 1A, a FACM 12 is comprised of a resident Dynamic License Database (Dldb) 14 and a License Functions Mechanism (LicMech) 16 wherein the LicMech 16, in turn, includes, a License Monitor/Control Mechanism (LMCM) 18, an Electronic License Control Utility (eLCU) 20 and a Graphical User Interface Mechanism (GUI) 22. The Dldb 14 is associated with the DCF 10, resides in a licensed user's system and contains information and data controlling the operations of the FACM 12 and defining and embodying the eLicense governing the use of that DCF 10 for a specific, individual eLicense installation, such as the terms, provisions and conditions of the license and product, user and user system identifications. The LicMech 16, in turn, is comprised of executable code to perform the FACM 12 functions as specified by the contents of the Dldb 14 and, as described in the following, is functionally embedded in the DCF 10 to comprise an integral part or component of the DCF 10. For data DCF's (music, video, etc.) the FACM 12 is functionally associated with the DCF 10 to authorize access and present the DCF contents to the media player or program that operates on the DCF 10. The LMCM 18, for example, implements the terms and provisions of the eLicense by communicating with and operating in conjunction with the associated resident Dldb 14 to monitor and control the use of the DCF 10 by determining whether the user and user system satisfy the terms and provisions of the license embodied in the Dldb 14 and providing access to the DCF Contents 10A on a User System 10B to a software media player or to an external portable device accordingly. The operations of the LicMech 16 thereby, for example, protect the DCF 10 from unauthorized use on the host system and from unauthorized use on another system or portable device or physical media, such asa CD. The LMCM 18 provides interprocess communication between the DCF, the DLDb and the other FACM components. The eLCU 20, in turn, provides a graphical user interface for an asset management tool that displays license control data for the eLicensed DCF's on the end user system. The graphical user interface provides mechanisms by which the FACM 12 communicates with External Systems 10C, described below, that perform functions and operations related to the ordering and purchasing of DCFs 10, the generation, electronic distribution and tracking of eLicenses, and so on, and transmits, receives and maintains local information regarding, for example, the user system identifier or the portable device identifier and customer financial information, the DCF 10 product ID, purchase receipt, license information, and so on. It will be understood, after the following descriptions and discussions, that External Systems 10C may also be comprised, for example, of a DCF 10 distribution server, a system server or portable disks or optical disks. The GUI 22 provides a User 10D interface to the user accessible functions of the LicMech 16, user specified data (logo, cover graphic, and/or banner ad graphics) embedded within the GUI and vital marketing and superdistribution capabilities for the DCF 10.

Lastly before describing the eLicense System and eLicense FACM 12 of the present invention in detail, it should also be noted that an eLicense as implemented by the FACM 12 of the present invention is provided with a number of unique features that arise from the structure and operation of the eLicense FACM 12 embedded in or digitally wrapped around each DCF 10. For example, each eLicense is or may be specific and tailored to the individual DCF 10 and to the environment in which it is to be used and the FACM 12 includes controls which are set according to the conditions of the eLicense. Each eLicense is system-locked, that is, is specific to the system or portable device in which the DCF 10 and its embedded eLicense are installed, and the components of the FACM 12 are heavily encrypted and protected and employ special inter-process communication with the DCF 10 to prevent unauthorized modification by a user.

A product containing the eLicense FACM 12 embodying a system-locked eLicense is moveable, however, allowing users to easily transfer the license authorization from one system to another. A product containing the FACM 12 of the present invention is also highly configurable as the publisher or distributor can create a wide variety of usage controls for a product and have an appropriate set of controls encoded in the electronically delivered elicense and seamlessly delivered to the user system. In addition, the system-locking mechanism within the eLicense FACM 12 adjusts and adapts to changes in the host environment to auto-update it's fingerprint according to relevant system changes. Then, according to sensitivity levels configured by the file licenser, so that the eLicense FACM 12 and an eLicense embodied by and implemented in an eLicense FACM 12 is dynamically checked and monitors, records and responds to such information as execution count and duration and other internal control factors each time the DCF is accessed.

The eLicense System and FACM 12 of the present invention and their operation is independent of any specific distribution or e-commerce method. The eLicense System and FACM 12 thereby supports, for example, purchase order, multiple copy or volume licensing, pre-paid download, and other commercial models which are not accommodated by conventional electronic software delivery systems. Remote eLicense acquisition is typically via standard HTTP communication methods for the Internet or for intranets, but elicenses can also be generated and installed manually for cases where remote connection and resulting automation is not possible. The eLicense System and FACM 12 system is network-independent, and may be used to provide and control licensed DCF 10s to standalone systems or to systems in a network environment, but does not depend upon network service.

Finally, the eLicense System and FACM 12 provide a vital marketing and 7a superdistribution capability by allowing the DCF to be electronically transferred to other user systems yet in a publisher configurable trial evaluation manner for subsequent purchase direct from the DCF 10 via the FACM 12 GUI 22.

As will be described, the eLicense System and FACM 12 also provides configuration of the behavior of licensed DCF 10s in distribution, in trial use, and in purchase options, based on pricing and customer profiles, on distribution channels, and so on. The trial use, purchase, license acquisition and installation of licenses for DCF 10s, as well as after-license options, are highly automated and happen seamlessly according to preset configurations and the eLicense System and license server OLS 36 allows a full range of activity reporting methods and strong integration with external database tools.

B. General Operation of an eLicense System (FIG. 2)

The following is a brief overview and general description of the operation of an eLicense System 24 for packaging, distributing, and authenticating eLicense enabled files containing digital content and the embedded FACM 12 of the present invention and provides an introductory description of the individual components and operation of an eLicense System 24, which will be described in further detail in following discussions.

Figure 2:
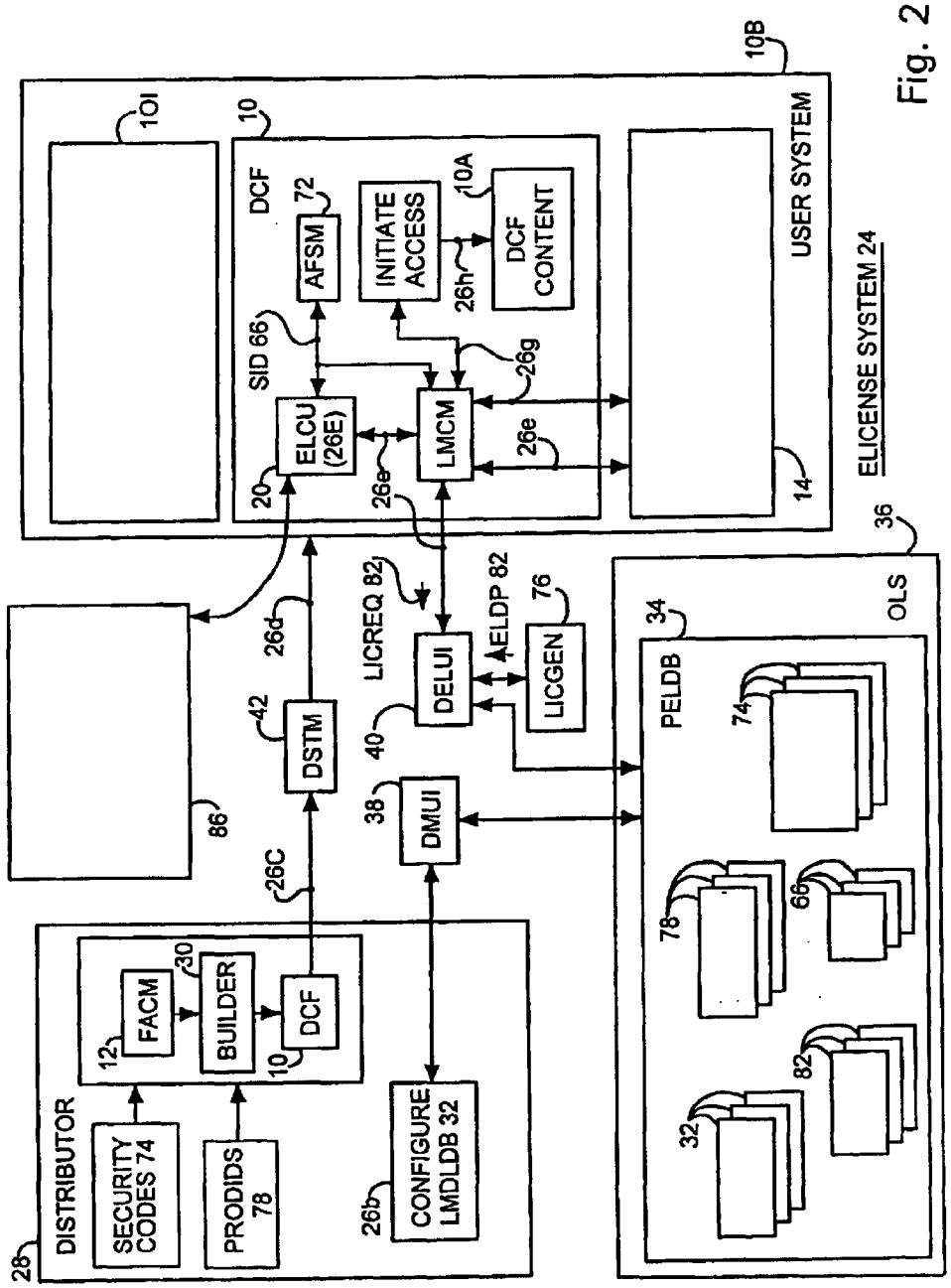
FIG. 2 is a diagram illustrating the basic operation of a file distribution system incorporating the eLicense System and file access control mechanism of the present invention.

Referring to FIG. 2, it is illustrated therein that the basic method for distributing a DCF 10 containing license controlled digital content and an embedded FACM 12 of the present invention includes the steps of:

Step 26a—A Distributor System (Distributor) 28, which may be a publisher, distributor or reseller of a DCF 10 containing licensed content, prepares a DCF 10 for distribution using any of the methods supported by the exemplary eLicense System 24 described herein, wherein the preparation of the DCF 10, hereafter referred to as a "licensable" DCF 10, includes embedding the LMCM 18 and an initial Dldb 14 in the DCF wherein the initial version of the Dldb 14 contains any terms, provisions and information necessary to enable a user to subsequently acquire an eLicense. As will be described below, the Distributor 28, which may be a publisher, distributor or reseller, willemploy a Builder 30 for these operations, or any equivalent utility.

Step 26b—The distributor also configures a License Management Dldb (LMDb) 32 that is to be associated with the DCF 10 wherein the LMDb 32 contains complete licensing information for the licensable DCF 10 and, as described in a following discussion, stores the LMDb 32 and such other information that may be necessary to monitor or control transactions involving the DCF 10, such as distribution channels and methods, pricing, and so on, in a Product Configuration/Order/License Database (POLDb) 34. The configuration of a LMDb 32 may be performed through a Distribution Manager User Interface (DMUI) 38 or through other supported database access tools or scripts suitable to the task.

The POLDb 34 typically resides in an Order/License Server (OLS) 36 that is accessible to the Distributor 28, directly via network access to the OLS 36. Intended users/licensees of the DCF 10s, which may be, for example, an individual user or a group, may use the licensed DCF 10 on a single, stand alone user system or in a networked system and will typically, and for example, have indirect network access to the OLS 36 via the LMCM 18. For these purposes, and as will be described further in a following discussion, the eLicense System 24 of the present invention provides a Distribution Management User Interface (DMUI) 38 through which a Distributor 28 may have access to the POLDb 34 to enter LMDbs 32, order and pricing information, and so on. The eLicense System 24 of the present invention also provides a Dynamic eLicense Management Mechanism (DeLMM) 40 through which the intended users/licensees of the DCF 10s, that is, the FACM 12 of the DCF 10s residing in the user systems, may access the POLDb 34 to dynamically create, acquire, update and modify eLicenses by providing information to the POLDb 34 and downloading corresponding information from the LMDbs 32 to the resident Dldb 14s, as described in the following.

Step 26c—The distributor provides the licensable DCF 10 to a selected Distribution Mechanism (DSTM) 42 wherein the DSTM 42 may be, for example, a Web site, an electronic store, a CD-ROM, or another distributor or reseller. It should be noted that examples of the methods supported by the present embodiment of an eLicense System 24 for preparation of a licensable DCF 10 are described in detail in a following description.

Step 26d—The licensable DCF 10 with an embedded FACM 12 and initial Dldb 14 is distributed to a user by means of the selected DSTM 42 wherein user receives a licensable DCF 10 that includes the LMCM 18 and an initial Dldb 14 containing information specifying the requirements for the types of elicenses to the DCF 10 that may be acquired by the user.

Figure 3A:
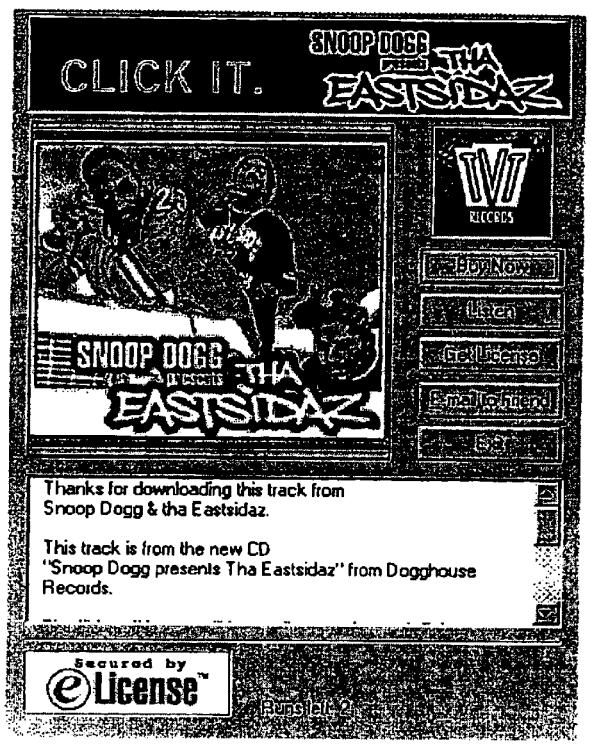
FIG. 3A is an illustration of a typical digital wrapper graphical user interface and 3B is an illustration of a typical electronic license control graphical user interface.

Step 26e—The user may request or initiate access to the licensed DCF 10 at runtime by, for example, executing the DCF 10 (if executable), initiating a program contained in the DCF 10 or by initiating a program that uses the DCF 10 and accessing the DCF 10 through that program. When the DCF is accessed, the GUI 22 appears, an example which is displayed in FIG. 3A, it provides the user options to TRY/LISTEN and/or BUY a license for the DCF. When the TRY/LISTEN button is chosen, the LMCM 18 communicates with the DLDb 14 and stores a trial license for the DCF, then the DCF executes or causes an associated program to execute under trial licensed control.

Step 26f—The user may also acquire a valid eLicense for the DCF 10 by requesting a license through the GUI 22 and carrying out the actions necessary to satisfy an electronic or phone-based or pre-paid purchase such as providing to the OLS 36 information relating to the user and the user's system and payment, and upon doing so, receives from the OLS an eLicense that is decrypted to construct a license record in the resident Dldb 14 which contains the information defining the terms and provisions of the elicense acquired by the user, whereupon the DCF 10 becomes a "licensed" DCF 10. As will be described below, the valid eLicense is created in the resident Dldb 14 by writing the appropriate information downloaded from the LMDb 32 into the resident Dldb 14, thereby converting the initial resident Dldb 14 into a valid license Dldb 14.

Step 26g—The license is validated with each runtime access of the DCF 10 by the license checking functions of the FACM 12 embedded in the DCF 10, that is, the LMCM 18, which locates the eLicense, that is, the resident Dldb 14 containing information relating to the eLicense, decodes the information contained therein, and affirms that the conditions and restrictions of the license are met.

Step 26h—If the license checks are passed, the user is permitted access to the contents of the DCF 10 for use in the normal fashion, and, if the license checks do not pass, the user is not permitted access to the contents of the DCF 10 and the user is presented with a Trial/Purchase GUI 22 (FIG. 3A) or an appropriate response, such as a message informing the user that the user does not have a valid license and the steps necessary to acquire a valid license.

With regard to Steps 26, it should be noted that the license checking functions may examine, for example, whether the system identifier matches that in the license, as the license is specific to a host system, whether the product identity is correct, whether duration, execution count, and cumulative time controls in the license havewxpired, and that the system clock has not been altered. It must be noted in this respect that the eLicense authorization is not a static entity or key, and that the DLDbs 14 and LMDbs 32 are dynamic databases. As such, and upon access to the DCF 10, the LMCM 18 writes information to the resident Dldb 14, for example, decrementing the execution counts if instructed to do so, adjusting the adaptive fingerprint system ID, recording the time of execution, and so on, and that the FACM 12 will write and read information to and from the LMDbs 32, for example, when transferring a license from one user system to another. In further example, such as in the case of an eLicense configured for Trial/Purchase the user is presented with a GUI 22 with Trial, Purchase, and Get License options as configured by the distributor. Thus, if the DCF 10 is copied to an unlicensed system, the FACM 12 will note the different host environment and will present the Trial/Purchase GUI 22 so that the user on that system can enter a Trial period or purchase a license for the DCF 10.

C. Elements and Operation of a FACM 12 (FIGS. 1A, 1B, 1C and 2)

1. The License Functions Mechanism (LicMech) 16 a. General Description of the LicMech 16

Having described the general components and processes of an eLicense System 24 and the FACM 12 of the present invention, the following will discuss and describe further aspects and details of the components and processes of an eLicense System 24 and the FACM 12 of the present invention.

It has been described above that each eLicense controlled DCF 10 includes an integral FACM 12 that includes a LicMech 16 that controls access to the contents of the file according to an electronic license embodied and implemented in a resident Dldb 14 that is associated with the DCF 10. As described, the resident Dldb 14 contains information defining the current terms and provisions of the license, and hereby embodies the eLicense governing the use of that DCF 10, while the LicMech 16 implements the terms and provisions of the eLicense by operating in conjunction with the information in the Dldb 14 to monitor whether the user and user system satisfy the terms and provisions of the license. The FACM 12 thereby validates and controls access to a DCF 10 by matching query criteria implemented in the LicMech 16 to license data residing in the resident Dldb 14 installed on the host system.

As will be described next below, there are several possible implementations of a LicMech 16 in the presently preferred embodiment of an eLicense System 24, each of which conforms to the present invention, each of which may be tailored to a different set of distributor and user needs, and each of which may be implemented to function with different types of DCF 10. In this latter respect, it must be noted that DCF 10s may be generally regarded as falling into either of two general classes of DCF 10 or, more specifically, as being either executable files or data files. Executable files are files whose primary content is executable program code of some form, such as application programs or object libraries. Data files, in turn, are files whose primary content is not executable code but is primarily data of any form that is operated upon or with by external programs, utilities or functions. Data files may include, for example, document, image, spreadsheet or database files and files containing digitally formatted audio and image information, such as video and audio files, music and movies.

As a consequence of the fundamental difference between the contents and resulting behavior of executable files and data files, the implementation of a LicMech 16 for executable and data files will likewise differ. For example, the accessing or initiation of an executable type DCF 10 will typically and normally result in the automatic execution of at least some components of the code residing therein. As such, additional code components, such as the executable code components of a LicMech 16 may be implemented as, for example, an API (Application Program Interface) library wherein the routines of the API library are linked into the compiled code of the executable DCF 10. The API functions are therefore functionally embedded in the executable code of the DCF 10 by the links to the API functions embedded in the executable code of the DCF 10 and will be automatically initiated and executed as an integral operation with the execution of the original executable DCF 10 code that is normally executed when the DCF 10 is accessed or initialized.

Another example of accessing or initiation of an executeable type DCF 10 will typically and normally result in the execution of the DCF 10 as re-constructed as an eLicense digital wrapper. Where the AP library comprising the LicMech 16 functions are linked into a digital wrapper dll (dynamic link library), rather than into the controls of the DCF. The API function calls for the necessary LicMech 16 mechanisms are performed from the digital wrapper dl and the FACM 12 mechanisms are used to access the contents of the DCF 10, thereby ensuring that the FACM 12 functions performing the license checking functions must likewise be present and executed. As a consequence, the LicMech 16 mechanisms are embedded functionally at runtime into the DCF 10, rather than directly and physically into the DCF 10.

In contrast, the accessing or opening of a data DCF 10 does not typically result in the automatic execution of code therein as a result of the accessing or opening of the file. Therefore, the method implemented by the present invention is to encapsulate the data residing in the original data DCF 10 in such a manner that the data cannot be accessed except through operation of components of the FACM 12 that must be present on the host system, as described further in this document.

b. LicMech 16s for Executable DCF 10s (FIG. 1B)

It has been described above that the LicMech 16 functions are, in a presently preferred embodiment of the invention, typically implemented as an API library that is functionally embedded in a DCF 10, but differ in the manner in which the LicMech 16 functions are functionally embedded in a DCF 10. The implementation of the LicMech 16 functions of the present invention for an executable DCF 10 to create an eLicense digitally encrypted or wrapped executable DCF 10 is illustrated in FIGS. 1B and 1C wherein FIG. 1B illustrates the structure and elements of an executable DCF 10 with embedded LicMech 16 API functions of the present invention and FIG. 1C illustrates the process of constructing an executable DCF 10 with LicMech 16 functions and of installing an executable DCF 10 with LicMech 16 functions in a user system.

Figure 1B:
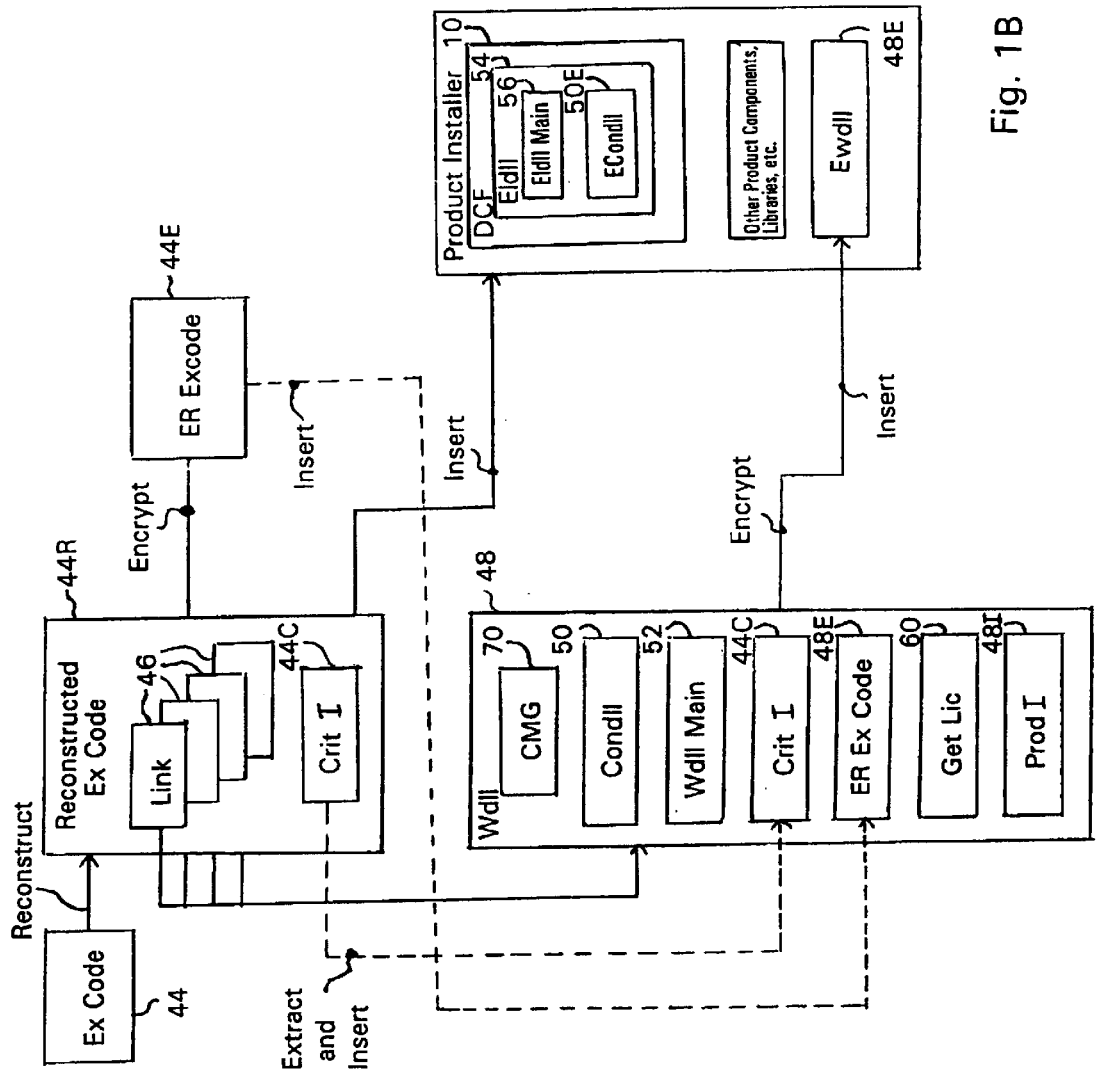
Figure 1C:
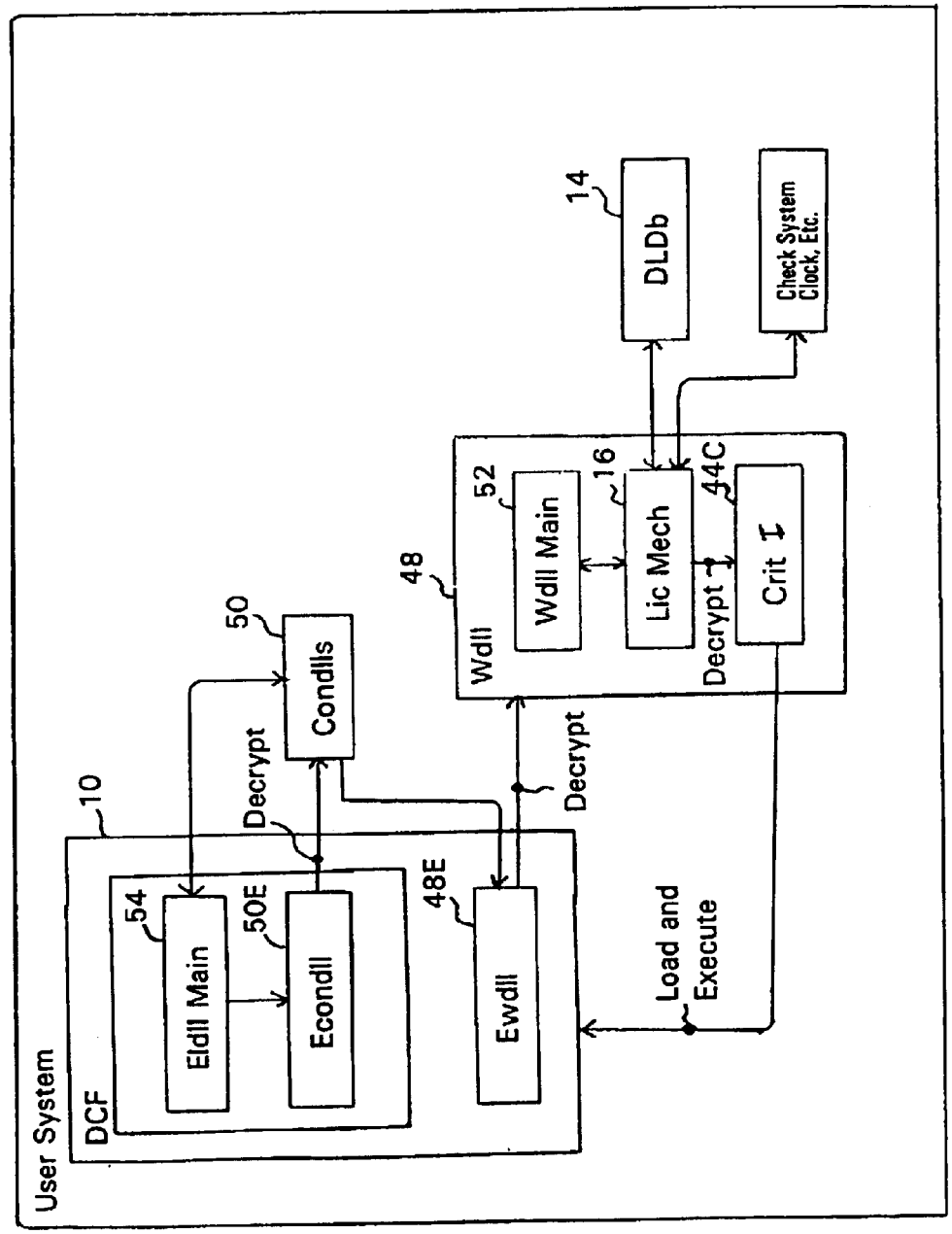

As illustrated in FIG. 1B, the LicMech 16 functions of the present invention are embedded in an executable DCF 10 by reconstructing the original DCF 10 Executable Code (ExCode) 44 into a Reconstructed ExCode 44R wherein Links 46 to a Wrapper Dll (Wdll) 48 inserted into the DCF 10 ExCode 44. The Wdll 48 comprises the FACM 12 API library and contains additional Control dlls (Condll) 50 for the FACM 12 functions, such as controlling the display and behavior of configured options for purchase and license generation, acquisition and control, and a Wdll 48 Main function (WdllMain) 52. In addition, information from the DCF 10 contents that has been identified as crucial and necessary to the execution of the DCF 10 executable code, identified in FIG. 1B as CritI 44C, is extracted from the DCF 10 and is inserted into and stored in the Wdll 48. The executable portions of the reconstructed DCF 10, which include the links to the Wdll 48 but do not includes the CritI 44C information, are then fully encrypted using, for example, 128 bit RSA encryption, to comprise an Encrypted Reconstructed ExCode (EREXCode) 44E, which is inserted into the Wdll 48.

The execution of the DCF 10 executable code will, because of the embedded links to the Wdll 48, result in invocation of the FACM 12 API library functions contained in the DLLs of the Wdll 48. In addition, the DCF 10 executable code cannot be executed without the presence of the Wdll 48 because of the CritI 44C information extracted from the DCF 10 and stored in the Wdll 48. In this regard, it must be noted that the DCF 10 code crucial information that is removed from the DCF 10 and inserted into the Wdll 48 will be unique to each DCF 10, so that each embodiment of the Wdll 48 is thereby unique to an executable DCF 10. As such, and should the Wdll 48 for a DCF 10 be de-constructed, that de-construction will not apply to any other FACM 12 DLL wrapped DCF 10.

The Wdll 48 is then combined or assembled with a licensing library, Distributor 28 determined settings and graphics elements, as described in further detail in following discussions, and is encrypted, again using, for example, 128 bit RSA encryption, to comprise an Encrypted Wdll (EWdll) 48E. The EWdll 48E, with the licensing library, settings, and graphics elements, an ELicense DLL (eLdll) 54 containing an ELicense DLLMain function (eLMaindll) 56 and encrypted Condll 50 functions to load, extract, decrypt and call functions of the Wdll 48. The Ewddl 48E and the reconstructed and encrypted DCF 10 executable are inserted into a Product Installer 101 with the other required product libraries and components.

The eLicense wrapped executable DCF 10 may then be conveyed to a user system and installed therein with an eLicense and the FACM 12 functions of the present invention by the typical product installation process.

During the product installation process, the eLicense wrapped executable DCF 10 is installed into a user system, with the EWdll 48E and the other product components. When the eLicense wrapped executable DCF 10 is executed, the Eldll 54 is loaded and called. The calling of the ELdll 54, in turn, results in the calling of an ELicense dll Main function (ELdllMain) 56, which determines if the required eLicense Control dlls (Condlls) 50 are present in the user system and, if present, whether the eLicense Condlls 50 present in the user system need to be updated. If the eLicense Condlls 50 are not present in the user system, or if the versions of the eLicense Condlls 50 must be updated, the ELdllMain 56 decrypts the Econdll 50E, extracts and installs the Condll 50 in the user system, typically onto a user system hard disk.

The eLicense Condlls 50 then extracts the Wdll 48 from the encrypted Ewdll 48E, decrypts the Wdll 48, and saves the Wdll 48 to a user system disk. In the presently preferred embodiment of the present invention, the Wdll 48 is saved to the user disk using a randomly generated file name.

The Wdll 48 is then loaded into the user system for execution, and a WdllMain 52 is called. The WdllMain 52, in turn, determines whether a valid eLicense exists in the user system and, if so, calls the Wdll 48 LicMech 16 functions which interoperate with the DLDB 14 and the user system to determine whether the terms and conditions of the eLicense are satisfied, as will be described in further detail in a following discussion. If a valid eLicense exists in the user system, and if the terms and conditions of the license are satisfied, the Wdll 48 LicMech 16 functions decrypts and loads the CRITI 44C executable portions of the DCF 10 code and the DCF 10 is allowed to execute normally, using the DCF 10 crucial information stored in the Wdll 48.

If a valid full license does not exist, the WdllMain 52 invokes the Wdll 48 LicMech 16 functions to display a GUI 22, described in further detail in a following discussion, providing an interactive interface to the user with the options available to the user. The appearance and functionality of the GUI 22 are variable according to settings and graphics configured by the publisher or distributor, as are the options presented to the user. For example, the user may be presented with an option to initiate a Trial use license, or to continue an existing Trial Use license where there is a current Trial license with allowed use remaining, to initiate a License/Product Purchase, using direct Internet, World Wide Web, or telephone e-commerce connections, or to Get a License if the user has pre-purchased the product and has obtained an Order Identifier (OrderID) 58, as described in a following discussion. If the result of the user's election is successful, and the user has, for example, started or continued a valid Trial Use, or acquires a valid eLicense, as described in a following discussion, the Wdll 48 LicMech 16 functions decrypt the executable portions of the DCF 10 code and the DCF 10 is allowed to execute normally, using the DCF 10 crucial information stored in the Wdll 48.

In summary, it will be seen from the above descriptions of the present invention that the functions performed by the FACM 12 are thereby injected into the runtime loading or accessing of the DCF 10 such that normal execution of or access to the contents of the DCF 10 is dependent upon execution of the FACM 12 code and satisfactory interaction of the wrapper FACM 12 with the user system and user, such as license acquisition or license checking and confirmation. In this regard, it must be noted that the original contents of the DCF 10 and at least the FACM 12 elements of the wrapper are usually permanently encrypted together to form a single entity, so that the FACM 12 is effectively embedded in the DCF 10, and that a user cannot access the contents of the DCF 10 without first executing the FACM 12 code of the wrapper, so that the wrapper thereby effectively encloses, or wraps, the DCF 10 contents.

Figure 3B:
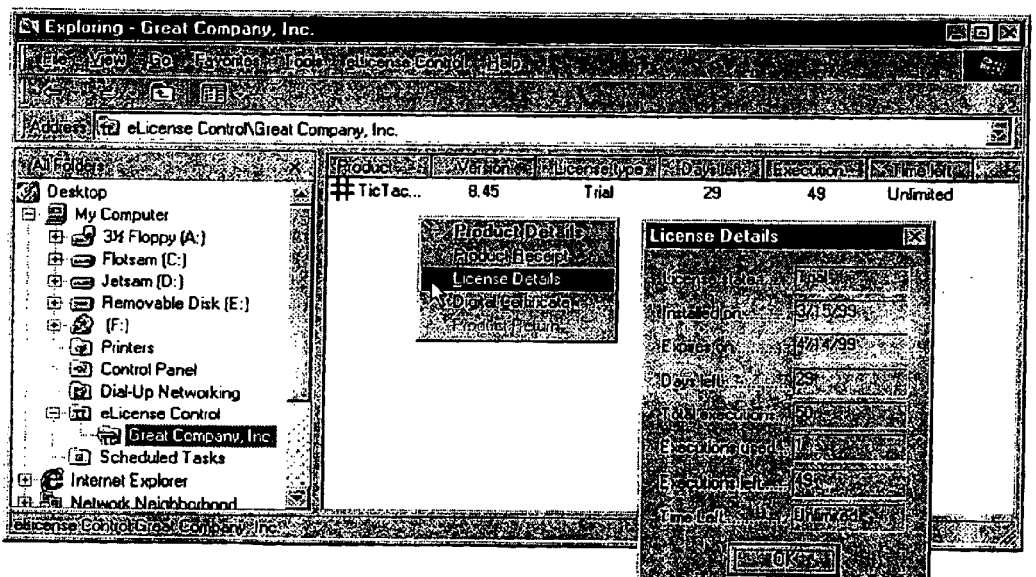

It will also be noted that, in addition to the FACM 12 code and the contents of the DCF 10, a graphical user interface for the eLCU 20 exists for such operations as selecting a product to query product details, product receipt, or license details are illustrated in FIG. 3B. In addition, processing product returns, un-licensing a product, or re-licensing a product to enable mobile licensing are configurable by a wizard tool for availability in the eLCU 20.

Prior to the installation of a purchased eLicense, the digital wrapper presents the user with GUI 22 showing the configured choices for trial use of the product, purchase of the product and acquisition of a license for use of the product. Publishers can incorporate custom graphics, promotional banners, and Web links into this GUI 22. Upon user selection of the "Trial" option the GUI 22 disappears and the DCF 10 may be accessed normally. The next time the DCF 10 is accessed in Trail mode, the wrapper GUI 22 appears again, and so on. After the acquisition and installation of an eLicense, the wrapper GUI 22 no longer appears until there is a change in the state or status of the license, yet the wrapper continues to transparently function in its license validation functions. The wrapper GUI 22 may appear again under appropriate conditions, such as if the software is copied to another, unlicensed system, if the software becomes "unlicensed" for any reason, or if the eLicense expires.

It will be further seen that the digital wrapper also includes the functionality necessary to acquire an eLicense and to register the eLicense and the purchase of an eLicense and store the information in the POLDB 34. These functions will include, for example, a Get License Function (GetLic) 60 that interacts with the GUI 22, the product related information and the user inputs to generate a request for an eLicense from the OLS 36. The license options and such information as, for example, DCF 10 product identity and price lookup codes, are contained in the Wdll 48 provided with the DCF 10 product initially. Another digital wrapper element, referred to as a Product Information (ProdI) 481 contains information used to register the DCF 10 product in the POLDb 34 using product information that is stored in the wrapper, such as DCF 10 product identity and price lookup codes. For a customer initiated purchase, the customer supplies required customer identity information, quantity to be purchased, request for shippable media, credit card information, and so forth. A purchase/license request is generated that includes the appropriate built-in codes from the wrapper and the customer supplied data automatically to the OLS 36, together with a unique identifier of the user system that is generated by functions included in the wrapper, which are described in a following description, resulting in a license installation which is specific to the DCF 10 product and its host environment.

It will be apparent, therefore, that an eLicense System 24 wrapper FACM 12 provides a single mechanism for what are normally disparate functions and operates as a master control from the time the software is installed through to the fully licensed and authorized use of the DCF 10. The wrapper includes, in a single mechanism, a set of trial license controls, an e-commerce purchasing mechanism, a volume licensing and pre-paid license acquisition mechanism, an automatic eLicense installation mechanism, a graphical user interface for product marketing and super-distribution functions, and a mechanism for monitoring and control of the licensed behavior of a DCF 10 purchased product.

As described above, the wrapper functions by injecting its own functionality into the runtime loading or accessing of the DCF 10. When the DCF 10 is accessed, its normal behavior is delayed pending satisfactory interaction of the wrapper FACM 12 with the system and user, including license checking. As also described, the original DCF 10 and elements of the FACM 12 wrapper are encrypted together to bond the two components into a single entity and to prevent the dissociation of the DCF 10 and the FACM 12 wrapper. As such, the FACM 12 wrapper is effectively a permanent component of the DCF 10, and never exposes the original contents of the DCF 10 to unauthorized copying or access. Finally, it must be noted that once the FACM 12 is prepared and bonded with a DCF 10 as described herein, the DCF 10 with the embedded FACM 12 may be included in a installation kit in the same manner as a conventional, unprotected file or executable program as the eLicense control applies to the DCF 10 and not to an installer by which the DCF 10 is installed in a system.

c. LicMech 16s Implemented for Data DCF 10s (FIG. 1D)

Figure 1D:
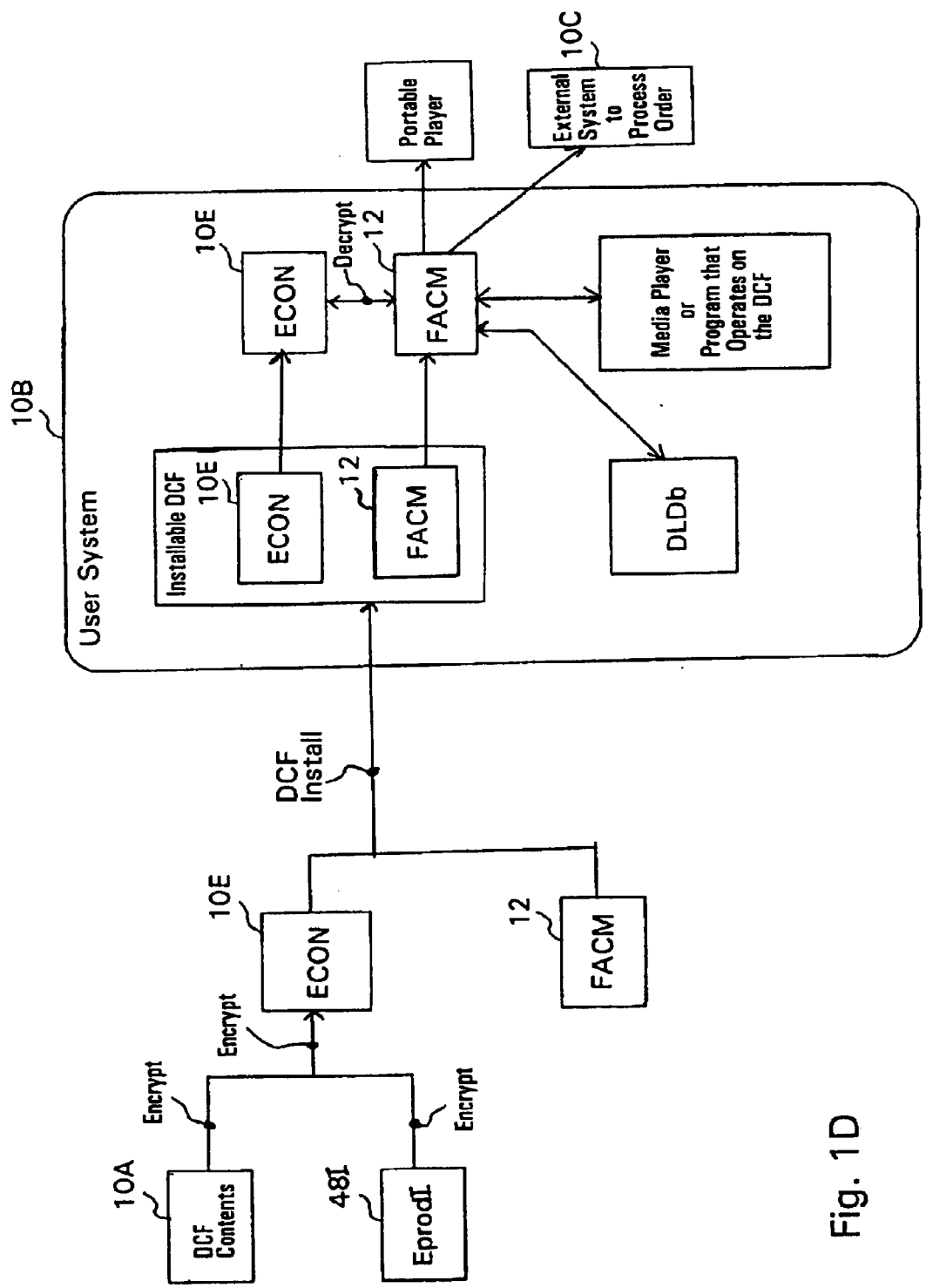

Now considering an implementation of an eLicense System 24 and FACM 12 of the present invention for data DCF 10s and referring to FIG. 1D, in the instance of data DCF 10s the data residing in the original data DCF 10 is encrypted using, for example, 128 bit RSA encryption, to generate an Encrypted Contents (ECON) 10E. The ECON 10E is added with certain product and license control information, that is also encrypted representing Product Information (PRODI) 48I. Such product information as Publisher 62, Product Identifier 78, Security Code 74 and a content type identifier is also encrypted into PRODI 48. The encrypted DCF 10 contents and the encrypted PRODI 48 are encrypted together into an Encrypted Digital Content File (EDCF) 10D. To prepare the EDCF 10D for electronic distribution with embedded license control, a DCF 10 install builder is run to generate an installable executable that contains the encrypted DCF and the FACM 12 code to control it. Once the installer is run, the EDCF 10D and FACM 12 are stored on the user system. When the ECON 10E is accessed by a media player or related program, the FACM 12 intercepts the access and performs a license validation according to licensing conditions and a system ID "fingerprint" comparison. If license validation passes, the ECON 10E is decrypted and is presented to the media player or program that operates on the DCF 10.

In this embodiment of the invention, therefore, the contents of the original data DCF 10 are transformed into an encrypted data DCF 10 using any selected suitable encryption method, so that the original data contents of the encrypted data DCF 10 may be accessed only through an appropriate Decrypt 62 or equivalent utility that is contained in the FACM. The DCF 10 Decrypt 62 is thereby accessible as a "helper utility" to application programs or utilities attempting to access the contents of the encrypted data DCF 10, and must be invoked to access the contents of the data DCF 10. An application program or utility attempting to access the encrypted data DCF 10 will be referred to the the FACM which controls and validates licensed access to the DCF.

In an alternate embodiment of the LicMech 16 for a data DCF 10, an application such as a viewer, player or editor, may be customized to use one or more types of eLicensed DCF 10 content, and a choice for that type or types of eLicense DCF 10 content added to the "Open" file type menu entries of the application. The application will be invoked and run for the selected type of eLicense DCF 10 content, whereupon the LicMech 16 will intercept the application file I/O to a chosen DCF 10 of that type of content by means of a monitor utility included in the FACM 12. Upon intercepting a file I/O call to a DCF 10 file of that type of content, the FACM 12 functions will determine if the file is an eLicensed wrapped data DCF 10 and, if so, will decrypt the DCF 10, check license validity, and allows the application to open the data file if a valid license exists in the system for that data DCF 10.

In yet another alternate embodiment of the FACM 12 for a data DCF 10, the eLicense System 24 components installed in a user system will include an eLicense Manager Tool as a desktop application that provides an alternate user interface for all eLicense functions and that uses the eLicense Dldb 14s and associated user functions of the FACM 12 for acquiring, installing, checking, and manipulating licenses, as described in further detail in the following discussions. In this embodiment, the eLicense Manager Tool will present a file or open menu that, in turn, provides a selectable list of choices of eLicensed data DCF 10 content types that can be chosen. Once a given data DCF 10 content type is selected, all eLicensed data DCF 10s of the chosen content type are listed by DCF 10 name and a specific data DCF 10 of the selected content can be selected from the list of DCF 10s and accessed by the user in a number of ways. For example, the user may double-click on the DCF 10 name and an a default associated application will be invoked and run to access the application after the FACM has been invoked to perform the eLicense validation and checking operations. In another embodiment, the user may right-click on the DCF 10 name and select an OPEN WITH option to browse and select an application to use to open the DCF 10, whereupon the DCF 10 will be opened by the application after the eLicense validation and checking operations have been performed by the FACM.

2. The Dldb 14 Structure and Contents

As described above, the Dldb 14 and LicMech 16 structures of the present invention provide a specialized, highly secure repository for license data on a user's system. An eLicense, that is, the terms and conditions that are enforced by the FACM 12, is implemented in the Dldb 14, which is a local, resident database record containing eLicense control parameters, including information pertaining to the controls for use of the DCF 10 as configured by the Publisher, the user's system on which the DCF 10 resides, and the runtime environment in which the DCF 10 is accessed. Each eLicensed DCF 10 is provided with its own unique and individual Dldb 14 that is independent of all Dldb 14s of all other DCF 10s, so that the eLicense control of each eLicensed DCF 10 is independent of the control setting of every other eLicensed DCF 10, even of the same type and same license terms and conditions. In the presently preferred embodiment of the eLicense System 24 of the present invention, information is stored in a Dldb 14 as ASCII strings and integers, which are preferably RSA encrypted, and the field sizes are flexible with each field including a field header indicating the actual data size associated with each field in the Dldb 14. The Dldb 14 structure is designed to be extensible for forward and backward compatibility, to allow record fields to be added or subtracted without interfering with existing data management, and to allow future expansion to contain virtually any data relevant to software licensing and asset management.

In general, and for example, the data contained in an eLicense Dldb 14 includes, but is not structurally or functionally limited to:

distributor, reseller, Publisher and product identifiers;

a system identifier, as described further in a following discussion;

license limitation controls;

the duration of license and expiration settings;

execution count controls;
cumulative hours of use monitoring;
publisher-configurable optional control codes;
clock setting monitoring to prevent bypassing of the duration control by changing the system clock settings;
license type setting, such as, node-locked, mobile, etc.; and,
the current license state, such as trial, normal license, or unlicensed.

The information contained in an initial resident Dldb 14, for example, contains various encoded controls that are configured by the publisher for the product and that form a license configuration template. The license configuration template and its contents may be optionally configured by the publisher for the particular product, sale and license conditions and so on contemplated by the publisher and an eLicense is generated from this configuration template, together with, for example, the system identifier and a system "fingerprint", as described below. The contents of Dldb 14s may be configured, modified or extended to contain any desired information or data necessary for, for example, enterprise asset management, software usage across networks, Digital Certificates, E-commerce purchase receipts, publisher contact information, and so forth.

Certain of the data record fields in a Dldb 14 are public, that is, are accessible to the user through the FACM 12 GUI FIG. 3B to allow the information therein to be viewed and queried. Other fields, however, are private, being used in license acquisition, validation and control, and are thus not accessible to a user to prevent unauthorized modification of an eLicense terms and conditions.

Considering specific examples of the types of information that may reside in a Dldb 14, the public fields may for example include:

a publisher Name: the name of the software publisher;

publisher Information: contact information for the publisher;

a Web Address: the web address of the publisher;

a Reseller Name: the name of the reseller from whom the DCF 10 was obtained;

a Product Name: the name of the product, designated by the publisher;

a Product Version: the product version, designated by the publisher;

Product Information: information about the product, designated by the publisher;

a Digital Certificate: if a digital certificate has been used in the publisher/user relationship;

a Receipt: a receipt for the product purchase for an e-commerce transaction;

License Type: whether the license is a Trial license, fully Licensed, or Unlicensed;

an Installation Date: when the eLicense was installed;

an Expiration Date: a date when the license will expire, if any;

Days Remaining: the number of days remaining until expiration of the license, or a designation as unlimited;

Executions Allowed: the maximum number of executions or accesses allowed in the license, or a designation as or unlimited;

Executions Used: the current count of executions or accesses, or a designation as unlimited;

Time Remaining: the remaining allowed use time, or the current state of the cumulative hours of use control, or as designation as unlimited; and, DCF 10 Type: the type of the licensed DCF 10, such as executable, music content, document, image content, and so on.

The private fields, in turn, may for example include:

a publisher ID: a unique code identifying the software publisher;

a Reseller ID: a unique code identifying the name of the reseller where the DCF 10 was obtained;

a Product ID: a code identifying the product; in this respect, it should be noted that in the presently preferred embodiment the combination of the publisher ID and the Product ID is an unique index to an eLicense data record, discussed in the following as the License Record;

a Security Code used in license validation for a fully licensed product;

an Adaptability Setting: a setting which governs how much a system fingerprint is allowed to vary and adapt to changes in the user system;

a Time Limit: the maximum cumulative hours of use limit, or a designation as unlimited;

a Date Stamp: each time the DCF 10 is accessed, the time is recorded herein is referenced by a clock tampering detection mechanism;

Custom Controls: publisher-customized codes referenced by embedded code function calls;

a Location: the path to the location of the eLicensed DCF 10 on the use system;

Trial Registered Flag: for publishers requesting trial users to register, this flag controls the appearance of a trial registration reminder;

an Install Code: an encrypted code used to transfer the eLicense from the server to the users system;

a Mobile Flag: a flag indicating whether a publisher has chosen to make the license mobile through the unlicense/relicense mechanism described herein;

a Return Flag: a flag indicating whether the DCF 10 product is enabled for return that is used in the unlicense process to provide a proof code for the publisher;

a Moderate License: an indicator that the license is under "moderate security"; and, a System ID: the system "fingerprint" as described herein below.

3. Communication and Access Control in a FACM 12 (FIGS. 1A, 1B and 2)

As described above, an eLicense control mechanism of the present invention for monitoring and controlling access to a DCF 10 includes, in association with each eLicensed DCF 10, a Dldb 14 for storing information defining the current state of the eLicense and the terms and provisions of the eLicense. In addition to DeLMM 40 for communicating with an OLS 36 and POLDb 34, which will be discussed further in a following description, a FACM 12 includes with a GUI 22, a LMCM 18 and an eLCU 20 for communicating with the Dldb 14 for various purposes, such as displaying license status, terms and options to a user, executing license enforcement operations, and acquiring and modifying licenses. Communication between the elements of the FACM 12 and the Dldb 14 occurs, for example, during initialization of the Dldb 14 for a newly installed eLicensed product, during installation of an eLicense record generated and retrieved from the OLS 36, during license checking, including the validation of a license, updates to its settings, writing an adaptive System Identifier (SID) 66, which will be discussed in detail in a following description, to the Dldb 14, in controlling the presentation of information to the user based on license conditions, and during presentation to the user of options for viewing license information and for initiating actions affecting the license.

a. Interprocess Communications (FIGS. 1A and 2)

In support of the above described communications, and as illustrated in FIGS. 1A and 2, the eLicense control mechanism of the present invention further includes Communication Support Mechanisms (CSMs) 68 for providing and controlling communication, for example, between the LMCM 18, the GUI 22, or the DeLMM 40 and the Dldb 14. The CSM 68s additionally function as access control and security mechanisms to inhibit or prevent unauthorized communication and access to, for example, the Dldb 14. In the presently preferred embodiment of a FACM 12, the communications with and between the components of a FACM 12, and in particular communication to and from the Dldb 14, as implemented in and through CSM 68s through interprocess communication methods and remote procedure calls rather than through conventional file input/output processes. In this regard, CSM 68s are provided with and embody at least one such communication method and, in the presently preferred embodiment of CSM 68s, incorporate several alternative communications methods and are implemented in DLL services resident in the Wdll 48s. The communication method for a given user system is indicated to CSM 68s by a Communications Method Selector (CMS) 70 resident in the Wdll 48s and determining the usable methods and, from the usable methods, selecting the preferred method, from information in the system "fingerprint" as represented in the adaptive System Identifier (SID) 66, thereby keying a given FACM 12 installation to the user system for which it is licensed. In the present embodiment of CMS 70 for user systems employing Microsoft Windows 95, 98 and NT, for example, CSM 68s employ Microsoft Windows MailSlots but, for certain system configurations, instead employ Windows messaging. Because these communication paths are not readily accessible to most users, as opposed to normal file input/output methods, and are thereby hidden from most users, this method of communication between FACM 12 components and of accessing Dldb 14s prevents the interruption or capture of communication between FACM 12 components and tampering with license information contained in Dldb 14s.

In addition, and as described above, the contents of a Dldb 14 may be encrypted in a manner similar to that described with respect to encrypted data DCF 10s and may require the use of loading services or drivers having sole ownership of the Dldb 14s and sole permission to access the Dldb 14s, wherein access to the loading services or drivers in turn requires the execution of LMCM 18 license checking processes to gain access to and use of the leading services or drivers. As a result, the information contained in an eLicense database, that is, in a Dldb 14, is encrypted, hidden and access-controlled, so that a Dldb 14 cannot be opened, viewed, copied, deleted, or renamed, or any other action taken except as permitted by the FACM 12 mechanisms.

Finally in this regard, in the presently preferred embodiment of FACMs 12 the communications between FACM 12 and elicense System 24 components involved in license checking use a randomized, asymmetrical return method, which cannot be intercepted by conventional debugging processes and thereby provide additional security for FACM 12 processes.

b. Viewing and Query of License Information, the GUI 22

As described herein above, a user may view and query an eLicensed DCF 10s license information, including the license acquisition and modification options available to the user, the current state of an eLicense, and so on, by means of the FACM 12 eLCU 20 GUI, which may display the relevant data from the public fields of the Dldb 14 associated with the DCF 10. In the instance of user systems employing Microsoft Windows 95, 98 or NT, for example, the FACM 12 eLCU 20 GUI is implemented as an extension of the Microsoft Windows Explorer and an eLicense Control Structure is added to the Explorer view. The user can expand the Control Structure view in a manner similar to a file tree structure with, for example, publishers listed under the main heading, with other information available to the user being displayed according to Microsoft Windows conventions. For example, a left mouse click on a publisher will displays publisher information, such as an active website link and the display for each publisher may, in turn, be expanded to display or list all of the installed eLicensed DCF 10s resident in the user system from that publisher, and the expanded view for each DCF 10 will display or list selected details from the public fields of the Dldb 14 associated with that DCF 10. In a similar manner, a right mouse click on, for example, a listed DCF 10 will display a menu of choices, such as the display of product details, receipt, license details such as installation and expiration dates, other use control settings and current conditions, digital certificates, and available actions. Continuing with the Microsoft Windows conventions, a right mouse click of the program icon for an eLicensed application also shows the same menu of choices.

4. The Adaptive Fingerprint Security Mechanism (FIGS. 1A and 2)

As described above, an eLicense System 24 and FACM 12 of the present invention employ information identifying a user system as an integral part of the eLicense generation, verification and validation processes performed by the LMCM 18. As indicated in FIGS. 1A and 2, the eLicense System 24 and FACM 12 of the present invention incorporate an Adaptive Fingerprint Security Mechanism (AFSM) 72 that performs a system/user fingerprinting process to determine a unique SID 66. As will be described further in a following discussion, the SID 66 determined for a user system is supplied to a template of configured license conditions for a given product and user situation, resulting in the generation of an eLicense which is specific to the user system, and is used in validation of an eLicense granted to a specific user system, user, product, and set of license conditions and provisions. The license validation process described herein above thereafter compares the current SID 66 as determined when a user or user system attempts to access a DCF 10 with the SID 66 encoded and recorded in the license, that is, in the Dldb 14, to verify that the DCF 10 software is authorized to reside and be accessed on and by the user and user system.

A SID 66, or fingerprint, is derived from a number of hardware and software elements in the host environment, that is, of the user system and, in the presently preferred embodiment, is expandable, providing for the incorporation of additional identifying elements as desired. The SID 66 also allows "weighting" of fingerprint elements wherein selected elements of the fingerprint are assigned a higher importance in license checking than others. The presently preferred embodiment thereby allows a range of selected types of modifications or changes to be made to a system without invalidating an existing eLicense and requiring the revalidation or re-acquisition of an eLicense for normal, expected modifications and changes that do not affect the basic terms and conditions of an eLicense.

When the eLicense license checking function performed by LMCM 18 is activated upon initial installation of a DCF 10 incorporating an FACM 12 of the present invention, the FACM 12 initiates AFSM 72 to acquire or determine a SID 66 from the current host environment and the SID 66 is recorded in the Dldb 14 during the eLicense acquisition process, as has been described above. Upon each subsequent accessing of the licensed DCF 10, and as part of the license validation process performed by the LMCM 18, the FACM 12 directs AFSM 72 to acquire or determine a current SID 66 for the current host environment, reads and decrypts the eLicense data from the Dldb 14, including the recorded SID 66, and compares the recorded SID 66 from the Dldb 14 with the current SID 66. If the current SID 66 matches the recorded SID 66 from the Dldb 14 exactly, then the installed eLicense is determined to be valid for the host system. If the current SID 66 does not match the recorded SID 66 from the Dldb 14 exactly, the FACM 12 performs an adaptive comparison of the recorded and current SID 66s to determine whether the current SID 66 is within the range of allowable variation from the recorded SID 66 and thus whether the installed eLicense is valid for the changed or modified host environment. In this regard, and while the identification of systems by "fingerprints" is known in the prior art, the AFSM 72 of the present invention is unique in operating adaptably in identifying a system that has changed or been modified from an originally licensed configuration and in providing selective levels of adaptability to modifications and changes, and in relative weighting of the elements selected to form a system fingerprint. The selective adaptability setting of the AFSM 72 of the present invention governs the extent or range of change or modification from an originally licensed host system environment that is allowed in a system before the recorded and current fingerprint comparison returns an invalid result, and provides several selectable levels of security, or adaptability, to change or modification. For example, a "strict" setting represents the highest level of security and allows no changes or modifications to the host environment while "moderate" and "easy" settings permit successively greater degrees of change or modification in the host environment. The selective adaptability or security setting is referenced by LMCM 18 during the license checking operation if the current SID 66 and the eLicense recorded SID 66 stored in Dldb 14 are not an exact match. If the degree of mis-match is within the range of tolerance determined by the adaptability setting, then the license check is passed and, if the degree of mis-match is outside the range of tolerance, then the license check is failed. In addition, when the comparison of the current and stored results in a mis-match that is within the range of tolerance permitted by the selective adaptability setting of the AFSM 72, and the license check is passed on all other factors, the current SID 66 is an allowable mis-match in this case, and the eLicense is actually rewritten to its database with the new system ID. The AFSM 72 of the present invention thereby uses algorithms derived from publisher-settable sensitivity levels to implement intelligent and adaptive fingerprinting processes to detect and adjust a SID 66 when specific parts of the system hardware/software configuration changes or is modified. For normal, incremental changes in a system, therefore, such as replacing a network card, upgrading a disk drive or processor, or upgrading or updating programs on the system, the license checking process will not fail and the license data is recreated dynamically to accommodate allowable changes in the SID 66 to accommodate allowable changes in the system.

5. Operation Of The FACM 12 (FIGS. 1A and 2)

In summary, and as described herein above, a FACM 12 is comprised of the eLicense System 24 components that are embedded in or associated with an eLicensed DCF 10 and reside in a user system to control the use of the eLicensed DCF 10 in conformance with the terms and conditions of the license granted to the user.

Referring to FIG. 2, an eLicense is created on an OLS 36 by a License Generator (LicGen) 76 when the necessary data and information is provided to the LicGen 76. The LicGen 76 typically resides in OLS 36 as eLicenses are generated from the information residing in POLDb 34, but may reside, for example, in a Distributor 28 system, in a publisher's system, in an order processing system as described in a following discussion, or in another system accessible to the User System 10B and having access to POLDb 34. As will be described in following descriptions of the license acquisition and modification processes, the information necessary to generate an eLicense is provided in part from the user system, in part from the POLDb 34 and in part from order and financial processing functions that may be a part of the OLS 36 or provided by separate systems. The data and information necessary to generate an eLicense includes a license definition template, indentified in FIG. 2 as a Partial Template (ParTemp) 78, that is configured by the DCF 10 publisher, that includes the basic terms and conditions for an eLicense, and that typically resides in the POLDb 34. The publisher may associate more than one ParTemp 78 with a given DCF 10, and the ParTemp 78 to be used in any instance may be distiguished, for example, by the sales model and price, wherein one ParTemp 78 is provided a license for unlimited use at one price, another ParTemp 78 is provided for a license for one year at another price, a third ParTemp 78 is provided for a license for short-term subscription use at yet another price, and so on. The generation of an eLicense will also require a Product Identifier (ProdID) 80, which is assigned by the publisher and stored in the DCF 10 delivered to the user system, and a System Identifier, or SID 66, that is generated by the AFSM 72. Finally, and as will be described in following descriptions of the license acquisition and modification processes, the generation of an eLicense also requires an OrderId 58 that is used to manage the lookup of license and product identifiers and license generation authorizations based on an e-commerce action by the user or resulting from other publisher/reseller relationships.

When the necessary product and license definition data and authorization have been supplied to the LicGen 76, an eLicense Security Code 74 is inserted into an Encoded License Data Package (ELDP) 82 wherein the ELDP 82, described further in a following discussion, contains the information, data, definitions and authorizations necessary to define an eLicense in a user's system. The ELDP 82 containing the eLicense is delivered to the user's system by any of a variety of methods and is installed therein by operation of the FACM 12. Thereafter, the FACM 12 embedded in the DCF 10 operates to enforce the terms and conditions of the eLicense as embodied in the associated Dldb 14 to control the use of the DCF 10 on the user system.

As described, an eLicense on a users system is embodied in a record in the Dldb 14 wherein certain of the fields in the record, such as a URL address of the publisher, are informational while other of the fields are used in the license checking, validation, and usage control processes. In the presently preferred implementation of an FACM 12 of the present invention, the fields that are used for license checking, validation, and usage control include:

a DCF 10 identifier field comprised of a publisher identifier field and a DCF 10 product identifier field;

a user system identifier field, that is, SID 66, containing a user identifier derived from the hardware and software components of the user system;

a system locked flag field indicating whether the license is system-locked to the user system;

a trial use flag field indicating whether the license is for a trial use wherein a trail license is generated locally on the user;

a custom field allowing, for example, license checking to validate against some publisher-defined element in the DCF 10 rather than the system fingerprint;

a Security Code 74 field containing a Security Code 74 matching a Security Code 74 residing in the POLDb 34 and accessible only to the publisher and to the LMCM 18;

a fingerprint adaptability setting field containing an Adaptability Value (Adapt) 84 and allowing the publisher to set the level of compliance required between the system fingerprint, that is, SID 66, in the Dldb 14 and a system fingerprint, or SID 66, determined at the time of license checking;

a grace period setting field determining a period in which the user is permitted to use the DCF 10 after the license expires or fails for any reason;

an expiration control field determining the use limits upon which the license expires;

a calendar expiration limit field determining a date upon which the license expires, if any;

an unlimited use field identifying whether the license has no time-based expiration;

a duration field identifying the number of days from the time the license was created and that may be designated as "standard", wherein the creation date remains the date of first creation of the license when the DCF 10 is relicensed, or "subscription", wherein the creation date is calculated anew when the DCF 10 is relicensed and accounts for all unused license period;

an order-based duration field wherein the expiration date of the license is calculated as a number of days after an OrderID 58 was created;

an auto-renewable field containing a duration setting after which period the license become automatically renewable;

a fixed date field identifying a fixed date on which the license expires;

an execution count limit field setting a number of times the DCF 10 may be accessed or used;

a cumulative hours limit field setting a number of hours that the DCF 10 may be accessed or used; and, custom control code fields used in embedded Wdll 48 implementations to allow a publisher to determine custom control conditions or limits.

Now considering the operation of an FACM 12 in performing the license checking functions of the FACM 12, the license checking routines of the API library residing in the Wdll 48 are invoked each time the DCF 10 is executed or accessed and perform the following sequence of operations:

(a) Locate in the Dldb 14 a record for the product, using the product identity information in the DCF 10 or in the Wdll 48s and check whether the license type is "Trial" or "Licensed".

(b) Call the AFSM 72 to generate a current SID 66 by examining the hardware and software components of the system.

(c) compare the SID 66 in the Dldb 14 with the current SID 66.

(d) if the SID 66 in the Dldb 14 and the current SID 66 match, proceed to Step (f).

(e) if the SID 66 in the Dldb 14 and the current SID 66 do not match, read the Adapt 84 setting in the Dldb 14 and, if the difference is within acceptable limits, proceed and set a fingerprint flag.

(f) Compare the Security Code 74 in the DCF 10 or the Wdll 48s with the Security Code 74 in the Dldb 14 and, if they match, proceed to Step (g). (NOTE that this step only applies to full licenses as locally generated Trial licenses do not have this data.)

(h) Examine the expiration date in the Dldb 14 and, if there is an expiration date, read the system clock to see if the expiration date has been passed and, if not, proceed to Step (i).

(i) Examine the execution counts field in the Dldb 14 and, if there is a limit, read the execution counter to determine how many times the DCF 10 has been accessed and, if there are execution permissions remaining, then set an execution count flag and proceed to Step 0)

(j) Examine the cumulative hours of use limit field and, if there is a limit, examine the accumulation and, if there is permissible time remaining, proceed to Step (k); (Note that tracking of cumulative use is done by incrementing the appropriate field in the Dldb 14 while the DCF 10 is running or is accessed and LMCM 18 detects when the running or access is initiated and is stopped.)

(k) Check the date stamp for the last time the DCF 10 was executed or accessed and, if that stamp is earlier than the current system time, then proceed to Step (1) or, if the date stamp is later than the current system time, then clock tampering is suspected and the user is provided a message to restore the correct system time, upon which the date stamp check will pass. If the user has set the clock ahead and accessed to DCF 10 to falsify the date stamp, then restoring the clock to the correct time will still show a wrong differential between the date stamp and the current system time. The user is then presented with a method of initiating a verification routine whereby the API DLLs will call and connect to a specific Internet URL address, acquire the current UCT time, and verify that the system clock is correct, whereupon the date stamp in the Dldb 14 will be reset.

(l) If the checks of Steps (a) through (k) have been performed and passed, execution of or access to the DCF 10 will proceed normally.

(m) Finally, and according to any flags which have been set during the license check, new data is written to the Dldb 14 pertaining to, for example, a new SID 66 to be used in fingerprint comparison and adaptability checking, a new count of the number of times the DCF 10 has been executed or accessed, a current system time.

Figure 4:
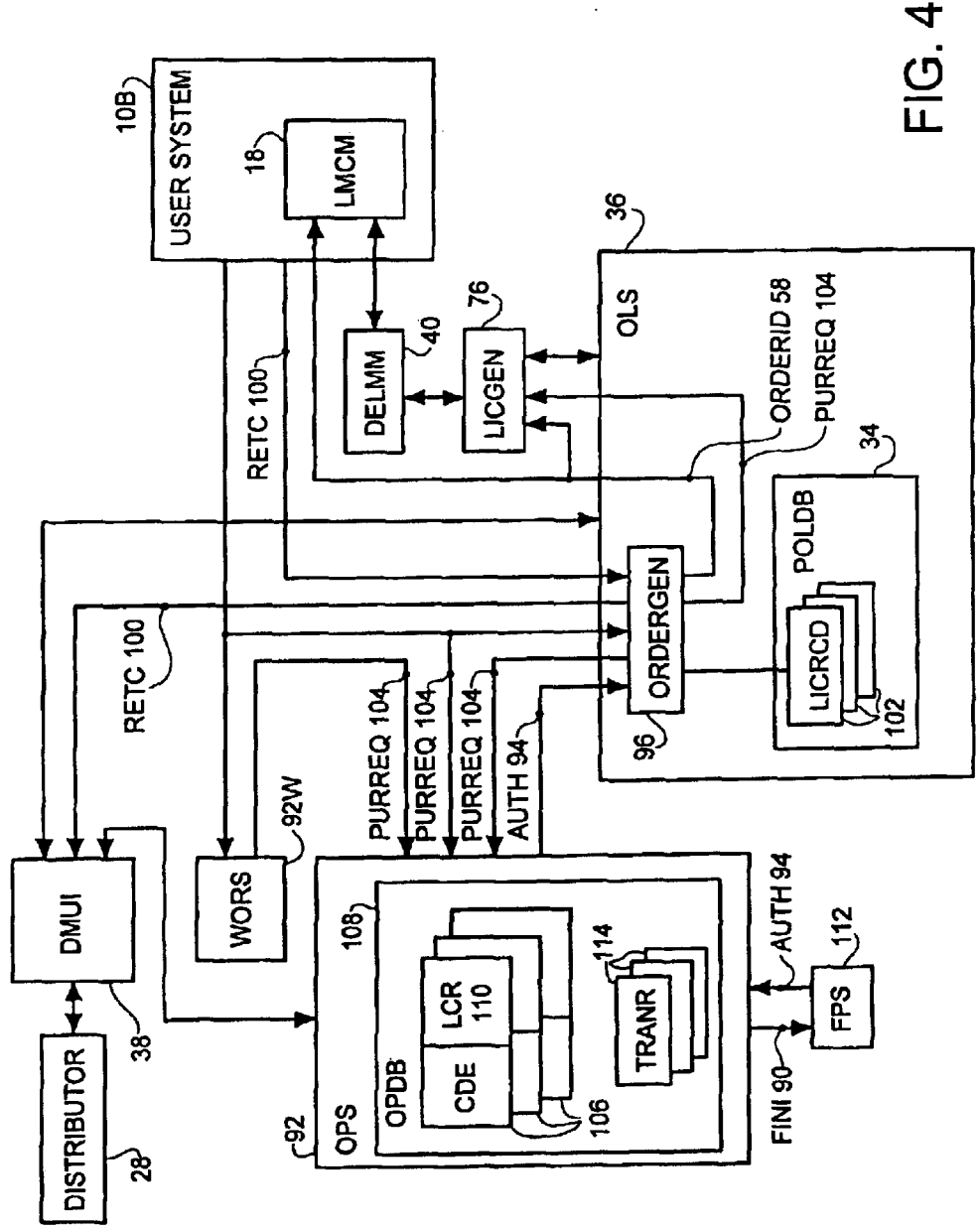
FIG. 4 is a diagrammatic representation of electronic license acquisition and order processing methods of the present invention.

G. License Acquisition and Order Processing Methods (FIGS. 2 and 4)

As described, an eLicense System 24 of the present invention is designed to support a wide range of license acquisition, order processing, credit card processing and product distribution methods and includes elements such as the DMUI 36 and DeLMM 40 to communicate with a POLDb 34 resident on an OLS 36 and with back-end processing systems of commercial transaction sites and facilities. The following will first discuss the basic methods for acquiring an eLicense and exemplary methods and procedures for the purchase of a DCF 10 and eLicense with reference to FIG. 2, and will then discuss the order processing and eLicense acquisition processes, which will be illustrated in FIGS. 2 and 4.

1. Basic Methods of eLicense Acquisition (FIG. 2)

As will be seen from the above discussions, the presently preferred embodiment of an eLicense System 24 of the present invention supports two primary methods for acquiring an eLicense, which may be referred to as the local and remote methods. It must be noted with regard to FIG. 2 and to the following discussions of license generation and acquisition and order processing that certain of the information required to generate a license request and acquire a license may be contained within a DCF 10 as originally provided to a User System 10B, may be generated by the FACM 12 mechansims from information available in a User System 10B, or may be provided from the POLDb 34 or from another source. The sources of such information for each method for license acquisition or order processing will be described in the following in association with the various methods for license acquisition or order processing. For convenience and reference, however, this information is represented in FIG. 2 as comprising a body of information identified as DCF 10 License Information (DCFLI) 101 residing in User System 10B in association with the FACM 12. It must also be noted that all of the information that may be involved in the acquisition and generation of an eLicense or in processing an order for an eLicense, is not shown in detail in FIG. 2 and that FIG. 2 instead, for purposes of clarity of presentation and discussion, focuses on certain of the more significant items of information. Examples of the information items that may be involved in the acquisition and generation of an eLicense or in processing an order for an eLicense, however, are discussed in the following descriptions.

First considering the local method for acquiring an eLicense, local generation of an eLicense is used, for example, for trial licensing of DCF 10s or for when a DCF 10 is marketed and distributed as a package with an eLicense, or in situations wherein the distributor, because of the selected marketing approach or because of the type of DCF 10, does not have a requirement to maintain a financial or license tracking system separate from that which can be implemented through local licensing.

In the local generation of an eLicense, all information necessary to create the eLicense, as described above, is contained in the DCF 10 or the DLLs of the FACM 12. The generation of the eLicense is initiated by installing the DCF 10 in the user system and calling the AFSM 72 to generate the SID 66 fingerprint data by scanning the hardware and software components of the user system. The SID 66 is passed to the eLCU 20 residing in the FACM 12 DLLs, which further determines, from the DCF 10, from the user system or from a ParTemp 78 in the FACM 12, such information as the ProdID 80, comprised of the publisher and product identifier codes, the license duration limit data, such as number of days from initialization to expiration, allowed execution of access count, allowed cumulative hours of use, last initialization date, last execution or access date, and so on. The eLCU 20 then uses this information to construct the terms and conditions of the eLicense in the Dldb 14, as described above. It should be noted, in this respect, that in the case of executable DCF 10s, wherein the FACM 12 is implemented by embedded code, these data inputs are explicitly written into the FACM 12 or the DCF 10 code by the publisher. In the case of data DCF 10s, wherein the FACM 12 is implemented by means of a Wdll 48, these data inputs are written into the Wdll 48s by the publisher at the time the DCF 10 is wrapped.

First considering the remote eLicense acquisition method in general, the user submits a request for an eLicense through the GUI 22 options for license acquisition and the relevant functions of the LMCM 18 generate a License Request (LicReq) 86 for a license and transmits the request to the DeLMM 40 and the LicGen 76 which, as described in further detail below, typcially resides in the OLS 36 server but may reside elsewhere. The LicGen 76 generates an ELDP 82 containing the terms, conditions and data comprising the requested eLicense transmits the ELDP 82 to the FACM 12. The LMCM 18, in turn, writes the terms, conditions and data of the eLicense into the Dldb 14 in the processes described below. The acquisition of an eLicense is typically executed through an Intranet or Internet connection, such as through a dail-up, modem, LAN or other connection to the World Wide Web, but may be accomplished by any other method providing communication of the necessary information between the user or user system and the OLS 36, such as by human intervention and communication. The same processes are executed and the same results are achieved regardless of the communications link used for the process, except that in one instance encrypted data is exchanged electronically and in other instances by, for example, phone, fax, or email. Also, it must be noted that, as described below, a remote eLicense acquisition may or may not be part of an e-commerce process which also involves the passage and validation of customer and credit card information and wherein, as described below, the process and results to not differ except in the type and range of data or information exchanged and in that certain of the information used to construct an eLicense and the ELDP 82 may be provided from different sources.

In further detail, therefore, the remote eLicense acquisition method is comprised of the steps:

(a) The LMCM 18 calls the AFSM 72, which generates a SID 66 fingerprint that the LMCM 18 encrypts and combines into a Request Identifier (ReqID) 88 with date and instance information.

(b) A LicReq 86 is constructed that includes a RequestID 88, the ProdID 80, read from embedded code or the wrapper of the FACM 12, and an OrderID 58, which may be pre-configured by the publisher or generated automatically as part of an e-commerce transaction.

(c) The LicReq 86 is sent via the DeLMM 40 to the LicGen 76, for example, through an Intranet or Internet communication and a standard, secured HTTP protocol.

(d) The OrderID 58 and ProdID 80 are used by the LicGen 76 to identify the ParTemp 78 assigned by the publisher for the requested license and conditions of acquisition.

(e) An eLicense is created by passing to the LicGen 76 the inputs

ProdID 80;
License type;
Security Code 74;
Adapt 84;
Expiration data;
Execution count limit;
Hours of use limit;
Custom control codes; and
SID 66, as extracted from the ReqID 88.

(f) The LicGen 76 returns an encrypted ACSII string which contains the requisite license data, that is, an ELDP 82, and a message containing the ELDP 82 is constructed and returned to the requesting system.

(g) Upon receiving the ELDP 82, the LMCM 18 and eLCU 20 call the AFSM 72, and the current SID 66 and the SID 66 contained in the eLicense data are compared. If they are the same, then the process will proceed. If they differ, then the Adapt 84 setting in the eLicense data is checked to see if the difference is within allowable limits. If it is, then the process will proceed.

(h) The Security Code 74 in the eLicense data is validated against the Security Code 74 in the DCF 10 on the host system, which may be embedded in the DCF 10 code or embedded within the FACM 12 wrapper.

(i) The ELDP 82 data is written to the Dldb 14, and the DCF 10 is fully licensed on the user system according to the limits and behavior set by the publisher.

2. Exemplary Methods For eLicense Acquisition

The presently preferred embodiments of the eLicense mechanisms of the present invention presently support a number of license acquisition methods, each of which may be used whether the eLicense mechanisms of the present invention are implemented through a licensing API and embedded in a DCF 10 or contained in a digital wrapper encapsulating a DCF 10.

In a first method, which may be used, for example, for purchased licenses, the FACM 12 constructs a remote LicReq 86. The request may be, for example, part of an e-commerce interaction or in fulfillment of a prepaid installation, such as may be provided as as part of multiple copy orders, a purchase order, or a pay-upon-download purchase. The LicReq 86 may, for example, be generated and submitted via HTTP and the Internet or an intranet, is transmitted to the LicGen 76, which generates a corresponding ELDP 82 containing the eLicense and returns the ELDP 82 to the requesting system, where they are received and installed automatically as described above.

In a second method, which may be used, for example, in cases where remote acquisition is not possible, provision is made for the manual conveyance of an encrypted eLicense code, such as email, fax, or telephone, that is entered or installed by the user to validate and activate the terms and provisions of a license conditions contained in the Dldb 14 that is initially provided with the FACM 12 bonded with the DCF 10.

In a third method, which may, for example, be used for trial use of software, no remote connection or interaction with a license database is required and the FACM 12 generates a trial license within itself and installs the license in a manner that is transparent to the user, the terms and provisions of the trail license being contained in the initial Dldb 14 accompanying the DCF 10 and FACM 12.

3. Exemplary Methods for Order Processing (FIGS. 2 and 4)

An eLicense System 24 of the present invention is additionally capable of supporting a range of order processing, credit card processing and product distribution methods, including multi-tier, multi-channel distribution of DCF 10s, and in the presently preferred implementations is designed to work with back-end processing systems such as may be found in present commercial transaction sites and facilities, such as on-line ordering businesses. This modular design thereby allows distributors and resellers to implement the system with minimal customization or with as much individual customization as desired. It will also be noted that the eLicense System 24 of the present invention may be employed with any type of DCF 10 or software distribution method, including CD-ROM, diskette and digital download, and on-line Internet transactions and that the eLicense System 24 of the present invention integrates order fulfillment from within the digital wrapper, from the publisher's website or from an online store.

For example, and referring to FIG. 2, a customer/user may acquire a DCF 10 and eLicense by downloading a Buy-only or Try-and-Buy version of a DCF 10 and then initiating a Purchase of the DCF 10 with an eLicense from the user's desktop using any of a variety of methods, each of which will result in the purchase and automatic delivery and installation of an electronic license. The user may initiate the acquisition of an eLicense through choices presented by the GUI 22 provided in the FACM 12. For example, the user may acquire an eLicense from the user's desktop, in the form of a ParTemp 78 provided in the FACM 12, or from a webstore wherein the GUI 22 links to purchase processes at the store, or from the publisher wherein the GUI 22 links to publisher website, or from a distributor whereby the GUI 22 links to a distributor hosted website.

In another example, and referring to FIGS. 2 and 1B, a customer/user may purchase a DCF 10 from publisher's website, online store or distributor site that downloads the DCF 10 wherein the DCF 10 has been paid for in the initial purchase. The customer may then choose a GUI 22 "Get License" option, which initiates GetLic 60. GetLic 60, in turn, operates in association with eLCU 20 to read an OrderID 58 which was provided with the DCF 10 download and stored in the Dldb 14 and transmits the OrderID 58 and other necessary information in a LicReq 86, as described above, to a LicGen 76 which responds by the automatic delivery and installation of an electronic license in an ELDP 82, wherein the terms and conditions of the eLicense are recorded in the Dldb 14.

In still another example, a customer/user uses a Purchase Order to buy a Purchase Order version of a DCF 10 in which the publisher has incorporated an embedded FACM 12 of the present invention and wherein the Dldb 14 contains the license terms and conditions under the Purchase Order. The customer/user then uses the FACM 12 and Purchase Order terms and conditions resident in the locally available Purchase Order version of the DCF 10 to acquire the user's licensed copy of the DCF 10, such as through a CD-ROM or a secure digital download from a distribution site. This method may employ an automatic license acquisition process wherein the customer/user goes online with the GUI 22 "Get License" option to acquire the eLicense as described above, or a "manual" license acquisition method in instances where for cases where network connection is not available. In the "manual" method, the customer/user provides a SID 66 to the publisher, and the publisher delivers an ELDP 82 to customer/user, through a telephone, facsimile or email connection, and the customer then installs the eLicense directly.

As described, the FACM 12 and eLicense System 24 of the present invention also support order processing, credit card processing and product distribution methods involving multi-tier, multi-channel distribution of DCF 10s and back-end processing systems such as a credit card processing system as may be found in or operating in association with present commercial transaction sites and facilities. For example, and as illustrated in FIGS. 2 and 4, credit card purchases may be originated at the user desktop using the appropriate GUI 22 option, whereby the customer information, SUD 66 and Financial Information (FinI) 90, such as credit card information, are collected by the GUI 22 and assembled by LMCM 18 into a Purchase Request (PurReq) 104. Then, using, for example, 128 bit RSA encryption, the PurReq 104 is by LMCM 18 through, for example, to Order Generator (OrdGen) 96 in the secure OLS 36 where it is decrypted, the secure OLS 36 being a component of, for example, the DCF 10 publisher's or distributor's enterprise or a component of a third party enterprise. The OrdGen 96 then securely transmits the PurReq 104 information to an Order Processing System (OPS) 92, which may be, for example, a back-end processing system such as a credit card processing system as may be found in or operating in association with present commercial transaction sites and facilities. The OPS 92 processes the order for authorization in the usual manner and generates an Authorization (Auth) 94 representing the authorization results that is returned to the OrdGen 96. Given a successful authorization, OrdGen 96 generates an OrderID 58 in the POLDb 34, which again may be a component of the DCF 10 publisher's or distributor's enterprise or a component of a third party enterprise. The Auth 94, PurReq 104 information and OrderID 58 are provided from the POLDb 34 to an associated LicGen 76, which may also be a component of the DCF 10 publisher's or distributor's enterprise or a component of a third party enterprise and will generally be implemented as a secure site. The OrderID 58 and the SID 66 from the customer's system are used to initiate the generation of an appropriate corresponding eLicense, which is then transmitted to the customers system in an ELDP 82 and which is automatically installed, and recorded by the eLCU 20 which maintains all product, receipt, Digital Certificate and license information and which may maintain such information in, for example, the Dldb 14 or in a separate data structure. A receipt may then be sent to the customer, for example, by email, and a Receipt/Order Identifier File (RORD) 98 is typically also downloaded to the customer system with the eLicense and may be recorded in, for example, the Dldb 14 or in a separate data structure.

For credit card purchases originating from a Website 92W, the PurReq 104 information, including the customer and credit card information and SID 66 are collected at the Website 92W, possibly by transmission from a user system as described just above, are transmitted from the Website 92W to the OrdGen 96, are collected at the OrdGen 96 and are sent to the OPS 92 for authorization, with the an Auth 94 returning to the secure OrdGen 96, as described above. Given a successful authorization, an OrderID 58 is generated by the OrdGen 96 and conveyed to the customer through, for example, a Web page or email. The Order ID 58 is also entered in the POLDb 34, for example through a CGI process, to enable the acquisition of an eLicense by the customer. In this instance, however, and instead of selecting the "Buy" option in the FACM 12 GUI 22, the customer chooses the "Get License" option and provides the OrderID 58 to the GetLic 60, which communicates the OrderID 58 to the OLS 36 through LMCM 18. When the OrderID 58 is received from the customer by the OLS 36, the OLS 36 initiates the automatic delivery and installation of the appropriate corresponding electronic license in an ELCP 82 as described above. Again, and as described above, the POLDb 34, OLS 36 and LicGen 76 may be a component of the DCF 10 publisher's or distributor's enterprise or a component of a third party enterprise, and a RORD 98 may be downloaded with the eLicense.

The eLicense System 24 of the presently preferred embodiment also provides a facility for product return within publisher or distributor selected time periods, such as within 30 days after issuance of an eLicense. The option for a product return is presented through the eLCU 20 GUI FIG. 3B, which, for example, reads the appropriate entries in the Dldb 14 to determine whether the request for a return is being submitted within the selected interval, executes the communications with the POLDb 34 necessary to deactivate the eLicense, and records the termination of the eLicense in the Dldb 14. This process requires that the user positively confirm that they really do want to return the product and acknowledge that the product immediately becomes unlicensed, and therefore unusable, when the return action is submitted and affirmed by the user. The DCF 10 is unlicensed by the writing of an appropriate modification to the data in the Dldb 14, as described, and a Return Code (RetC) 100 is generated by eLCU 20, dependent upon completion of the modification to the license data in the Dldb 14, and is transmitted to the OrdGen 96. The RetC 100 includes and is based on the OrderID 58, and can thereby be validated by the OrdGen 96 to ensure that a real return, and not an invented or fraudulent return, is being performed. The OrdGen 96 authenticates the RetC 100 and return operations, and transmits the authenticated RetC 100 to the publisher or distributor for an appropriate payment and record adjustment, such as a credit card charge adjustment. Because the generation of a RetC 100 is dependent upon successful modification of the eLicense data in the Dldb 14 to reflect the termination of the eLicense, and because the RetC 100 is based on and includes the OrderID 58, the publishers and distributors are assured that a DCF 10 is not usable after a return is completed without the need for complicated and lengthy proof-of-destruction process.

H. eLicense System 24 Administration Mechanisms, DMUI 36 and eLCU 20 (FIGS. 1A,2 and 4)

As described above, an eLicense System 24 of the present invention includes administration mechanisms for the publishers, distributors and resellers of DCF 10 products. One such mechanism is the DMUI 36 interface to the order processing database, that is, to POLDb 34, for business administration functions, such as product registration, pricing, sales and order management operations and related activities, as described herein above. A second such mechanism is the DeLMM 40 interface to POLDb 34 for dynamic eLicense management functions and as accessible to both the publishers, distributors and resellers, to determine and manage the terms and conditions of the eLicenses issued to users, and to the users, through the eLCUs 20 of the FACMs 12, to obtain, update and modify the terms and conditions of the eLicenses resident in the FACM 12 Dldb 14s.

1. DMUI 36 and the eLicense System 24 Business Administration Mechanisms First considering the business administration mechanisms of an eLicense System 24, DMUI 36 provides an interface to the POLDb 34s for the registration and configuration of publisher, distributor, product, and e-commerce data. It is used, for example, for the registration of publishers and distributors, the registration of products for purchase and licensing, the creation of pricing lookup data for product purchases, the activation of purchase order based licensing, the creation of control conditions for the generation of eLicenses, the monitoring of volume license activity, the tracking of real-time sales, the processing of product returns, queries and reports on order activities, and so on. In general, the data and information created or managed through DMUI 36 is used to enable the purchase and licensing of products. In this regard, it must be noted that certain data appearing in a POLDb 34 and managed through the DMUI 36, such as product SKUs or other identifiers, is also configured into and stored in the initial resident Dldb 14s of DCF 10 products for purposes of initiating the purchase or licensing of the DCF 10 product, thereby linking the DCF 10 products to the data residing in the POLDb 34s.

As shown in FIG. 2, the DMUI 36 also provides configurable interface functions to external OPSs 92, such as e-commerce systems and credit card processing systems, and a POLDb 34 may be configured to store and processing any information or data necessary to t support such OPSs 92. In this regard, a key element in linking POLDB 34s with OPSs 92 is the OrderID 58, which has been described herein above as being created internally by an eLicense System 24 following the validation of, for example, credit card processing, and which then becomes a trigger or initiator for current and subsequent eLicense generation. An OPS 92 may generate an OrderID 58 upon validation of the purchase of a DCF 10 by a user and will write the OrderID 58 into the POLDb 34 through the external order processing support facilities of the DMUI 36 through, for example, a CGI connection or a manual interface. Once entered into the POLDb 34, the OrderID 58 will initiate the generation of an eLicense generation for a calling user system submitting the OrderID 58 in a request for an eLicense in the same manner as for a request for an eLicense that has been submitted directly to the POLDb 34 from the DeLMM 40 of a DCF 10 having an FACM 12. The eLicense System 24 of the present invention and DMUI 36 thereby allows the customer information to be gathered and stored elsewhere than in the POLDb 34, that is, in the OPS 92 as the OrderID 58, rather than the physical presence of the customer information in the POLDb 34, is the initiating element in generating and issuing an eLicense.

2. DeLMM 40, LicGen 76 and the Generation and Administration of eLicenses

As discussed above, and while the DMUI 36 functions focus on order processing and product configuration, the eLicense System 24 mechanisms accessed through DeLMM 40 are directed to the generation, issuance and administration and issuance of eLicenses and include the license related databases described herein above and a license generation engine that includes LicGen 76 that operates with the databases to generate and administer eLicenses. The DeLMM 40 related mechanisms also provide the capability to configure and alter the license conditions associated with installed DCF 10 products, to interface and interoperate with the LMCM 18s of DCF 10 products, and to access, update, modify, query, track, and report eLicense transactions for single and volume licensed DCF 10 products. The DeLMM 40 mechanisms also provide a capability for monitoring enterprise licensing where a large number of licenses are being shared among users and support multiple license databases and vendor sub-licensing interactions across, for example, the Web.

First considering the forms and sources of information required to generate an eLicense, it has been described herein that the terms, conditions and information defining and forming an eLicense reside in a DCF 10 product in the Dldb 14 and the Dldb 14 resident information, together with the control mechanisms of the FACM 12, comprises an eLicense for a specific DCF 10 product and user system. The license information resident in a Dldb 14 at any time will define the then current terms and conditions of use of the associated DCF 10 and may vary from only the information necessary to acquire a functional license or the information defining an initial trial license to the information defining a fully functional license, such as the product identity, the SID 66, control information for duration and executions, and other optionally configurable data to be used in the validation and control of use of the DCF 10.

Each eLicense, other than those initially configured into the initial Dldb 14 of DCF 10 products, is generated by the LicGen 76 which performs the license generation functions in association with a number of associated components of the license generation engine, such as the LMCM 18s and the eLCUs 20 of DCF 10 products and from information from a variety of sources in the eLicense System 24. For example, the initial eLicense related DCF 10 product and control information to be used in generating eLicenses for specific products and user systems is configured into one or more Partial Templates (ParTmps) that are created by the publisher or distributor and that reside in, for example, POLDb 34, wherein each ParTmp contains information related to at least one type or configuration of eLicense for a DCF 10 product. As has been described, other of the information required to generate an eLicense for a given DCF 10 product, user and user system reside in the initial resident Dldb 14 of a DCF 10 product, which will contain, for example, at least a product identification and the information necessary to enable the DCF 10 product's eLCU 20 to generate a request for an eLicense for a given DCF 10 product, a given user or user system, and a given type of license. Still other information for generating an eLicense, such as a SID 66, will be generated from the user system by the FACM 12, while yet other information, such as an OrderID 58, will be provided, either indirectly from the user system or transparently from a POLDb 34 or OPS 92 during an e-commerce transaction or explicitly through a license request from the user system. It will also be understood that certain of the information used by LicGen 76 in generating an eLicense may be provided from two or more alternate sources, and that the source or path from which or through which information is provided will depend, for example, on method by which the eLicense is being acquired, the type of eLicense being acquired, the DCF 10 product, the configuration or context of the user system, and the configuration of the publisher and distributor systems.

Upon receiving a request for an eLicense, which may be initiated in a number of ways as described herein above, LicGen 76 identifies the appropriate license template corresponding to the DCF 10 product for which an eLicense is requested, reads the contents of the license template, receives the other necessary information, such as the SID 66 and OrderID 58, from the user system and POLDb 34 or OPS 92, and so on, and generates an ELDP 82. The ELDP 82 is then transmitted or otherwise conveyed to the user system by any of the methods described herein, such as through DeLMM 40 and the LMCM 18, where the LMCM 18 of the FACM 12 installs the information in the ELDP 82 into the Dldb 14 to form the final license management Dldb 14 that is accessed and used by the LMCM 18 to control the use of the DCF 10. LicGen 76 also creates a corresponding License Record (LicRcd) 102 containing the ELDP 82 in the appropriate POLDb 34, thereby providing a local record of the eLicense for use by the publisher and distributor.

As described, the terms and provisions of an eLicense implemented by an eLicense System 24 of the present invention are not static but are dynamic and change with, for example, time, the choices of the user, and the controls and constraints selected by the publisher. When license validation takes place, and thereafter at each access to the DCF 10 or FACM 12, the eLicense data residing in the Dldb 14 is read by the LMCM 18 and data is thereafter written back into the Dldb 14 as appropriate. The data written back into the Dldb 14 may include, for example, incremental changes to execution counts, the time of execution, to be referenced upon the next access to detect clock tampering detection, and changes or modifications to the system identifier, as described in a following discussion, and thereby ensures that the license controls reflect the actual state of usability of the DCF 10 according to the current terms and provisions of the eLicense.

The mechanisms for supporting dynamic terms and conditions, together with the above described mechanisms for acquiring and installing the terms and conditions of an eLicense, further operate to allow a user, publisher or distributor to modify the state or terms and conditions of an eLicense. For example, a user may initially acquire a restricted use license, such as a trial license, a license for a defined period, or a partial license activating only a part of the functionality or contents of a DCF 10 product. At a subsequent time, the user may generate a request for modification of the license, such as the purchase of a full license, a renewal of a license period, an activation of the full functionality or contents of the DCF 10, or other change in the terms and conditions of the license. The user will generate the request through the GUI 22 or eLCU 20 GUI options available to the user under the license terms and conditions in force at that time and the request will be forwarded to the LicGen 76, for example, through LMCM 18 and DeLMM 40. The request will operate as a request for a new license or as a request for a modification to a license, depending upon the differences between the existing and requested licenses and the policies, terms and conditions determined by the publisher or distributor. If the request functions as a request for a new license, LicGen 76 will operate as described above to generate a new license, generate a corresponding LicRcd 102, and transmit the ELDP 82 defining the new eLicense to the FACM 12 of the DCF 10 product. In this instance, however, the request will identify the existence of the previous license and certain of the information used to generate the license may be provided from the LicRcd 102 of the previously existing license. If the request operates to modify the previously existing license, LicGen 76 will read the information pertaining to the previously existing from the corresponding LicRcd 102, will modify the LicRcd 102 to reflect the modified license, and will generate a new ELDP 82 that is transmitted or conveyed to the user system and that is used by LMCM 18 to modify the information residing in the Dldb 14 appropriately.

LicGen 76 also operates to allow a user to disable, suspend or terminate an eLicense on a system by means of an unlicense option provided to the user through the eLCU 20 GUI. This mode of operation thereby provides, for example, for "mobile licensing" wherein an eLicense may be moved from one user of system to another, allows control of the aggregate use of multiple licenses and supports subscription licensing. This capability thereby also supports, for example, the "pooling" of licenses so that a limited number of users across a larger group of systems can share a limited number of licensed DCF 10s, with any unused period of authorization, with the original expiration date, or unused runtime permissions being returned to the license database for use by other users.

An "unlicense" operation is performed when a user wishes to terminate an eLicense for any reason, such as when the user wants to transfer a license for one machine to another or to return a product, or for any reason wishes to terminate the eLicense. A user initiates an "unlicense" operation by appropriate interaction with the eLCU 20 GUI, whereupon the LMCM 18 will respond to the user input by modifying the resident version of the eLicense information residing in the Dldb 14 to indicate that the eLicense is terminated, thereby placing the DCF 10 in a dormant state. The LMCM 18 will also transmit or otherwise convey the modified state of the eLicense to the LicGen 76, for example, through the LMCM 18 and DeLMM 40, together with any relevant information, such as any unused license period or activations. LicGen 76 will then respond to the notification of the terminated state of the eLicense by accessing and appropriately modifying the information residing in the corresponding LicRcd 102 and will adjust or modify the license permission status associated with the OrderID 58. The license status associated with the OrderID 58 may then, for example, allow the license for a given DCF 10 product to be re-acquired by the original user or acquired by another user or system, with the conditions of the "new" license depending on the type and extent of settings as limitations associated with the terminated license. As described above with respect to the modification of license terms and conditions, and by operations of the same mechanisms, the current usage data and expiration setting are passed back to the OLDb 34 and OLS 36, so that the re-acquisition of the license for a new user or system will carry the adjusted limitations from the previous state of the license at the time the license was uninstalled from the previous user or system. Adjustments to expiration, allowed execution counts, and so on are thereby handled within the licensing database upon re-licensing according to information passed to it by an unlicense action.

It should be noted that with respect to the "unlicensing" and "relicensing" of a DCF 10 that the presently preferred implementation of an eLicense System 24 provides several types of license duration controls or provisions. These options include a standard license duration provisions wherein the original expiration date of a duration-limited license is retained across multiple unlicense-relicense actions, a subscription provision for a selected license duration wherein the dormant time between and unlicense and relicense results in a new expiration date, and a fixed expiration date provision wherein the license will expire at a publisher-defined time regardless of when the installation occurred. The presently preferred implementation also provides, for example, an "auto-renewable" license provision for a sequence of short duration licenses wherein each short duration license becomes automatically available within the licensing database for re-acquisition by the same user or by a new user when the short duration license expires.

It should also be noted that the "unlicensing" and subsequent "licensing" of a DCF are accomplished by discrete actions of the individual users interacting with the FACM and with the Dldb 14 and OLDb through the eLCU 20 GUI, rather than through network or system administrative functions, and that control of the access to a DCF 10 is performed entirely within and by the FACM 12, thereby not requiring network or system level monitoring of use of the DCF 10. The system of the present invention thereby significantly reduces the system or network administrative tasks and overhead.

3. eLicense System 24 Databases, System Configurations and OrderID 58s (FIGS. 2 and 4)

It will be apparent from the above discussions that an eLicense System 24 of the present invention may operate with one or more database structures in addition to the Dldb 14 structures associated and resident with the DCF 10s having FACMs 12, such as a POLDb 34 and one or more OPS 92 databases, and with a number of possible system configurations. For this reason, an eLicense System 24 of the present invention supports and operates with several database models and is modular in structure to support and operate with a number of system configurations.

An exemplary implementation of the FACM 12 of the present eLicense System 24 could be, for example, a Turnkey eLicense System 24 that provides a DCF 10 product distributor with a complete system that includes the POLDb 34, OLS 36 and DSTM 42 components of an eLicense System 24 and a Builder 30 for creating and embedding FACMs 12 in DCF 10 products distributed and licensed by the distributor. All components of the FACM 12, including the license acquisition, validation and control routines and all aspects of the user available options and interfaces effectively become part of the FACM 12. In addition, all components of the eLicense System 24 engaged in the generation, 7 granting and administration of eLicenses, including all financial functions and including the POLDb 34 and order processing database structures, reside and are implemented within a self-contained eLicense System 24. All product order and purchase operations and license generation operations are thereby performed within the Turnkey eLicense System 24, with the link between the order processing and license generation processes being, as described above, through OrderID 58s. This implementation is therefore appropriate, for example, for customized licensing configurations which involve sub-component licensing, third party libraries, and sales models where e-commerce is not the primary focus. This implementation also allows, for example, increased marketing brand awareness by allowing the incorporation of publisher, distributor or reseller specific design elements into the wrapper, allows publishers, distributors, and resellers to create customized wrapper implementations, and allows the addition of the eLicense mechanism of the present invention to current ESD and DRM (Digital Rights Management) implementations.

In other implementations of eLicense System 24s, however, the eLicense System 24s are required to operate in cooperation with various forms of external OPSs 92, such as publishers and distributors having their own order processing systems and associated databases, e-commerce systems and credit card processing systems. The modular structure of the eLicense System 24 elements and the eLicense System 24 facilities for exchanging information with external systems, such as OrderID 58s, however, allows an eLicense System 24 to easily link to and operate cooperatively with such external systems to perform order processing externally while performing the license generation functions internally. In addition, and again because of the modular structure of an eLicense System 24 elements and the inter-system communications facilities provided in an eLicense System 24, an eLicense System 24 may be hosted on a single system, or among several systems or provided as a service to other systems by a host system or systems.

An example of the relationship and use of the database structure of an eLicense System 24 is illustrated in FIG. 4 for an eLicense System 24 implemented in an e-commerce system for the distribution of DCF 10 products provided with purchase-enabled digital wrapper FACMs 12. As illustrated therein, this exemplary implementation of an eLicense System 24 includes a User System 101B, an OPS 92 residing in an E-Commerce System for performing order processing related operations, and a LicGen 76 that implements the eLicense generation and management functions of the present invention.

As described herein above, the process begins with the submission of a Purchase Request (PurReq) 104 from a User System wherein the Purchase Request typically contains a product identifier, quantity, delivery and maintenance information or selected options, user/purchaser identification and information, and financial information, such as a credit card number. The PurReq 104 is received by an OPS 92 of the E-Commerce System, which uses the product and quantity information from the PurReq 014 to locate and determine a Cost Data Entry (CDE) 106 for the product and license in an Order Processing Database (OPDb) 108. The CDE 106, in turn, identifies the cost of the product and license and contains a License Control Reference (LCR) 110, or pointer, to a set of license controls which have been assigned to that product at that price and that are stored in a ParTemp 78 residing in the POLDb 34. The cost of the DCF 10 product and license, which may include shippable goods cost and maintenance costs, is passed to a Finance Processing System (FPS) 112, together with the user's FinI 90. Upon a return authorization from the Credit Card Processing Element, a Transaction Record (TranR) 114 is created and stored in the OPDb 108 and the OPS 92 generates an OrderID 58 corresponding to the DCF 10 product the license. The OrderID 58, which has been described herein above, is transmitted to the LicGen 76 which responds to the OrderID 58, the ParTemp 78 and product definition information in the manner described in detail herein above by obtaining a SID 66 from the User System and generating and transmitting an ELDP 82 and RORD 98 to the User System and writing a LicRcd 102 in POLDb 34.

It will be apparent from the above discussions that the order processing and financial operations of an eLicense System 24 and the license generation and management operations of an eLicense System 24 are modular and functionally independent from one another, with the essential link between the order processing and financial operations and the license generation and management processes being provided by OrderID 58s. As a consequence, an eLicense System 24 can easily be implemented in conjunction with an external OPS 92, such as a backbone processing system which supports a number of World Wide Web stores or e-commerce enterprises. In addition, and because the order processing and credit card components, for example, are modular and communicate through standard information formats, such as standard credit card authorization messages and OrderID 58s, an eLicense System 24 can be constructed from a wide range of existing or future order processing and financial system components.

It will be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. A digital content file including a license control mechanism for controlling the licensed use of digital content, comprising:

a digital content, and an embedded file access control mechanism embedded in the digital content file, including a license functions mechanism embedded in the digital content file and including a license monitor and control mechanism communicating with a dynamic license database and monitoring use of the digital content by a user to determine whether a use of the digital content by a user compiles with the license defined in the dynamic license database, and a license control utility providing communications between a user system and an external system to communicate license definition information between the user system and the external system, including a graphical user interface associated with the license control utility to provide communication between a user and user accessible functions of the license functions mechanism, and the dynamic license database wherein the dynamic license database is associated with the digital content file for storing information controlling operations of the file access control mechanism and license information controlling licensed use of the digital content.

2. The digital content file including a license control mechanism for controlling the licensed use of digital content of claim 1, wherein:

the license monitor and control mechanism is responsive to an attempt by a user system to access the digital content for comparing information obtained from the user system regarding use of the digital content and allowed uses of the digital content as defined by the license information residing in the dynamic license database and determining whether a use of the digital content by a user complies with the license defined in the dynamic license database.

3. The digital content file including a license control mechanism for controlling the licensed use of digital content of claim 1, wherein:

the information contained in the dynamic license database and controlling licensed use of the digital content can be accessed only through the license monitor and control mechanism embedded in the digital content file.

4. The digital content file including a license control mechanism for controlling the licensed use of digital content of claim 1, wherein:

the digital content can be accessed only through license functions mechanism embedded in the digital content file.

5. The digital content file including a license control mechanism for controlling the licensed use of digital content of claim 1, wherein the information contained in the dynamic: license database and controlling licensed use of the digital content further includes:

system fingerprint information identifying a user system on which the digital contents are licensed for use, and the license functions mechanism further comprises:

an adaptive fingerprint security mechanism responsive to an attempted access of the digital contents for obtaining current system fingerprint information from the user system and comparing the current system fingerprint information with the system fingerprint information in the dynamic license database, and wherein the license monitor and control mechanism is responsive to a comparison of the current system fingerprint information with the system fingerprint information in the dynamic license database to allow the user system to access the digital content when the current system fingerprint information compares with the system fingerprint information in the dynamic license database to within a predetermined range of tolerance.

6. The digital content file including a license control mechanism for controlling the licensed use of digital content of claim 5, wherein:

the license monitor and control mechanism is responsive to a comparison of the current system fingerprint information with the system fingerprint information in the dynamic license database when the current system fingerprint information compares with the system fingerprint information in the dynamic license database to within a predetermined range of tolerance for writing the current system fingerprint information into the dynamic license database in replacement of the system fingerprint information previously stored in the dynamic license database.

7. The digital content file including a license control mechanism for controlling the licensed use of digital content of claim 1, wherein the digital content of the digital content file comprises:

executable code.

8. The digital content file including a license control mechanism for controlling the licensed use of digital content of claim 1, wherein the digital content of the digital content file comprises:

digital data.

9. The digital content file including a license control mechanism for controlling the licensed use of digital content of claim 8, wherein the digital content of the digital content file comprises:

media data.

10. The digital content file including a license control mechanism for controlling the licensed use of digital content of claim 9, wherein the digital content of the digital content file comprises:

music data.

11. The digital content file including a license control mechanism for controlling the licensed use of digital content of claim 9 wherein the digital content of the digital content file comprises:

video data.

12. The digital content file including a license control mechanism for controlling the licensed use of digital content of claim 9, wherein the digital content of the digital content file comprises:

media data to be presented to a user through a media player, the system fingerprint information includes authorized media players, and herein the license monitor and control mechanism is responsive to a comparison of current system fingerprint information identifying a media player accessible by the user system with the system fingerprint information in the dynamic license database identifying authorized media players to allow the user system to access the media data when the current system fingerprint information identifies a media player registered as an authorized media player in the system fingerprint information in the dynamic license database.

13. The digital content file including a license control mechanism for controlling the licensed use of digital content of claim 1, wherein the information contained in the dynamic license database and controlling licensed use of the digital content includes:

user accessible information defining a license available to a user and controlling use of the digital contents by the user.

14. The digital content file including a license control mechanism for controlling the licensed use of digital content of claim 13, wherein the information contained in the dynamic license database and controlling licensed use of the digital content further includes:

license purchase information defining the terms of purchase of at least one license available to a user, and the license control utility and license monitor and control mechanism are responsive to user input through the graphical user interface for accessing the purchase information in the dynamic license database, accessing the user system to obtain system information identifying the user system in which the digital content is to be used, communicating purchase information fore license selected from the at least one license defined therein to an external system, receiving from the external system license information corresponding to the purchase information, and writing the license information into the dynamic license database for use by the license monitor and control mechanism in controlling licensed use of the digital content by the user.

15. The digital content file including a license control mechanism for controlling the licensed use of digital content of claim 13, wherein:

the license information contained in the dynamic license database for controlling licensed use of the digital content further defines license conditions for use of the digital content in a user system, the license control utility and license monitor and control mechanism are responsive to user input through the graphical user interface requesting activation of the license defined in the dynamic license database for accessing the user system to obtain system information identifying the user system in which the digital content is to be used, confirming that the system information and user request for activation of the license defined in the dynamic license database complies with the license defined in the dynamic license database, writing the system information into the dynamic license database to be part of the license information contained in the dynamic license database for controlling licensed use of the digital content, and activating the license defined in the dynamic license database.

16. A method for constructing a digital content file to be installed in a user system wherein the digital content file includes an embedded file access control mechanism for controlling the licensed use of digital content and wherein the digital content of the digital content file includes executable code, comprising the steps of:

generating a reconstructed executable code by, extracting from the executable code information identified as critical and necessary to the execution of the executable code, and inserting links to a wrapper dynamic linked library, the wrapper dynamic linked library including a control dynamic linked library containing control functions for the display and behavior of options for license purchase and generation, and a main dynamic linked library including, a license functions mechanism, and the extracted information identified as critical and necessary to execution of the executable code, generating an encrypted reconstructed executable code by encrypting the executable code of the reconstructed executable code and the links inserted into the reconstructed executable code, generating an encrypted wrapper dynamic linked library by encrypting the wrapper dynamic linked library, and constructing a product installer by combining the encrypted reconstructed executable code, the encrypted wrapper dynamic linked library, a dynamic license database, and a license decrypt/extraction mechanism.

17. The method of claim 16 for constructing a digital content file including an embedded file access control mechanism for controlling the licensed use of digital content wherein the digital content of the digital content file includes executable code, wherein the embedded file access control mechanism includes:

the dynamic license database for storing information controlling operations of the file access control mechanism and license information controlling licensed use of the digital content, and the license functions mechanism, wherein the license functions mechanism includes a license monitor and control mechanism communicating with the dynamic license database and monitoring use of the digital content by a user to determine whether a use of the digital content by a user complies with the license defined in the dynamic license database, and a license control utility providing communications between a user system and an external system to communicate license definition information between the user system and the external system, including a graphical user interface associated with the license control utility to provide communication between a user and user accessible functions of the license functions mechanism.

18. A method for installing a digital content file in a user system wherein the digital content file resides in a product installer and includes an embedded file access control mechanism for controlling the licensed use of digital content, a dynamic license database for storing information controlling operations of the file access control mechanism and use of the digital content and wherein the digital content of the digital content file includes executable code, comprising the steps of:

decrypting and extracting the contents of an encrypted wrapper dynamic linked library herein the dynamic linked library includes a control dynamic linked library containing control functions for the display and behavior of options for license purchase and generation, and a main dynamic linked library including, a license functions mechanism, and extracted information identified as critical and necessary to execution of the executable code, storing the license functions mechanism in the user system, determining whether the dynamic license database contains information defining a license controlling use of the digital content in the user system, and when the dynamic license database does not contain information defining a license controlling use of the digital content, executing operations defined by information in the dynamic license database and controlling operations of the file access control mechanism for obtaining license information defining a license controlling use of the digital content In the user system, and when the dynamic license database contains information defining a license controlling use of the digital content, executing operations defined by information in the dynamic license database and controlling operations of the file access control mechanism for obtaining license information defining a license controlling use of the digital content in the user system decrypting and extracting the contents of an encrypted reconstructed executable code wherein the encrypted reconstructed executable code includes executable code of the digital content containing links to the wrapper dynamic linked library, and storing the executable code of the digital content in the user system.

19. The method of claim 18 for installing a digital content file in a user system, wherein:

the license functions mechanism is stored in the user system using a randomly generated file name.

20. The method of claim 19 for installing a digital content file in a user system, wherein:

the dynamic license database is stored in the user system using a randomly generated file name.

21. A method for accessing the digital content of a digital content file in a user system wherein the digital content includes executable code and the digital content file includes an embedded file access control mechanism, comprising the steps of:

in the file access control mechanism, intercepting an attempt to access the digital content and validating licensed access of the digital content by, determining whether a dynamic license database associated with the file access control mechanism contains license information defining a license controlling user of the digital contents, determining whether the user system complies with a license defined by license information contained in the dynamic license database, and when the user system complies with a license defined by license information contained in the dynamic license database, allowing access to the executable code and to information extracted from the executable code and stored in a main dynamic linked library associated with the file access control mechanism.

22. A method for constructing a digital content file to be installed in a user system wherein the digital content file includes an embedded file access control mechanism for controlling the licensed use of digital content and wherein the digital content of the digital content file includes data, comprising the steps of:

generating an encrypted contents by encrypting the digital contents, generating an encrypted products information containing information used in obtaining license information controlling use of the digital contents, generating a digital content file containing the encrypted contents and the encrypted products information and generating an encrypted digital content file by encrypting the digital content file, and generating an installable executable containing the encrypted digital content file and an embedded file access control mechanism including a decrypting mechanism.

23. The method of claim 22 for constructing a digital content file including an embedded file access control mechanism for controlling the licensed use of digital content wherein the digital content of the digital content file includes executable code, wherein the embedded file access control mechanism includes:

a license functions mechanism, wherein the license functions mechanism includes, a license monitor and control mechanism communicating with a dynamic license database and monitoring use of the digital content by a user to determine whether a use of the digital content by a user complies with the license defined in the dynamic license database, and a license control utility providing communications between a user system and an external system to communicate license definition information between the user system and the external system, including, a graphical user interface associated with the license control utility to provide communication between a user and user accessible functions of the license functions mechanism, the decryption mechanism, and a dynamic license database that is associated with the file access control mechanism for storing information controlling operations of the file access control mechanism and license information controlling licensed use of the digital content.

24. A method for installing a digital content file in a user system wherein the digital content file wherein the digital content includes data and is contained in an installable executable containing an encrypted digital content file and an embedded file access control mechanism including a decrypting mechanism, comprising the steps of:

downloading an installable executable containing the digital content file, wherein the installable executable includes encrypted digital contents, encrypted products information containing information used in obtaining license information controlling use of the digital contents, an encrypted digital content file, containing the encrypted contents and the encrypted products information, and an embedded file access control mechanism including a decrypting mechanism, and executing the installable executable to store the file access control mechanism and the encrypted digital content file in the user system.

25. The method of claim 24 for installing a digital content file in a user system wherein the digital content includes data and is contained in an installable executable containing an encrypted digital content file and an embedded file access control mechanism including a decrypting mechanism, further comprising the steps of:

invoking the file access control mechanism to determine whether the dynamic license database contains information defining a license controlling use of the digital content in the user system, and when the dynamic license database does not contain information defining a license controlling use of the digital content, executing operations defined by information in the dynamic license database and controlling operations of the file access control mechanism for obtaining license information defining a license controlling use of the digital content in the user system.

26. A method for accessing the digital content of a digital content file in a user system wherein the digital content file wherein the digital content includes data contained in an encrypted digital content file and the digital content file includes an embedded file access control mechanism including a decrypting mechanism, comprising the steps of:

in the file access control mechanism,
intercepting an attempt to access the digital content and validating licensed access of the digital content by,
determining whether a dynamic license database associated with the file access control mechanism contains license information defining a license controlling user of the digital contents,
when the dynamic license database contains information defining a license controlling use of the digital content,
decrypting encrypted product information contained in the encrypted digital content file and determining whether the user system complies with a license defined by license information contained in the dynamic license database, and
when the user system complies with a license defined by license information contained in the dynamic license database,
decrypting the digital contents from the encrypted digital content file and providing the digital contents to the user system.

27. The method for accessing the digital content of a digital content file in a user system of claim 26, wherein:
an application in the user system is designated to access at least one designated type of digital content file, and
the file access control mechanism includes a monitor to intercept attempts to open digital content files of the at least one designated type by the application and to invoke the file access control mechanism to execute the steps for validating licensed access of the digital content.

28. A method for distributing a digital content file including a license control mechanism for controlling the licensed use of digital content of the digital content file, comprising the steps of:
preparing a licensable digital content file, containing
a digital content,
an embedded file access control mechanism, including
a license functions mechanism including
a license monitor and control mechanism communicating with a dynamic license database for monitoring use of the digital content by a user to determine whether a use of the digital content by a user complies with the license defined in the dynamic license database,
an adaptive fingerprint security mechanism for accessing a user system and determining fingerprint information identifying the user system, and
a license control utility providing communications between a user system and an external system to communicate license definition information between the user system and the external system, including
a graphical user interface associated with the license control utility to provide communication between a user and user accessible functions of the license functions mechanism, and the dynamic license database wherein the dynamic license database is associated with the digital content file for storing information controlling operations of the file access control mechanism and license information controlling licensed use of the digital content, wherein
the dynamic license database initially associated with the licensable digital content file contains initial license information defining the requirements for at least one license that may be obtained by a user of a user system,
providing the licensable digital content file to a user system through a distribution mechanism, and
in the user system,
accessing the initial license information in the dynamic license database to determine the requirements for the at least one license that may be obtained by a user of the user system, including
accessing the user system to obtain system fingerprint information identifying the user system in which the digital content is to be used,
executing the requirements defined in the initial license information to obtain license information defining a license allowing use of the digital contents, and
writing the license information and system fingerprint information into the dynamic license database for use by the license monitor end control mechanism in controlling licensed use of the digital Content by the user.

29. The method of claim 28 for distributing a digital content file including a license control mechanism for controlling the licensed use of digital content of the digital content file, further comprising the steps of:
configuring a license management database to be associated with the licensable digital content file and containing license information for controlling use of the digital content file in compliance with a license defined by the license information, and
storing the license management database in a product configuration and order database, and
wherein the step of executing the requirements defined in the initial license information to obtain license information defining a license allowing use of the digital contents further includes the steps of:
in the user system, and by operation of the file access control mechanism,
generating a request for a license containing user system information, including system fingerprint information and providing the request to the product configuration and order database,
in the product configuration and order database,
reading the license management database corresponding to the digital content file and request and generating license information defining a license for use of the digital content in the user system,
providing the license information defining a license for use of the digital content in the user system to the user system, and
in the user system, and by operation of the file access control mechanism,
writing the license information into the dynamic license database to define a license for use of the digital content in the user system.

30. The method of claim 29 for distributing a digital content file including a license control mechanism for controlling the licensed use of digital content of the digital content file, further comprising the steps of:

in the user system,
    intercepting an attempt to access the digital content and validating licensed access of the digital content by,
    determining whether the dynamic license database contains license information defining a license controlling user of the digital contents, and
    when the dynamic license database contains information defining a license controlling use of the digital content,
        accessing the user system to obtain current system fingerprint information identifying the user system,
        determining whether the user system compiles with a license defined by license information contained in the dynamic license database, including determining whether the current system fingerprint information corresponds with the system fingerprint information stored in the dynamic license database within a predetermined range of tolerance, and
    when the user system complies with a license defined by license information contained in the dynamic license database,
        allowing the user system access to the digital contents.

31. A method for providing a license for use of digital content in a digital content file residing in a user system wherein the digital content file includes an embedded file access control mechanism for controlling the licensed use of digital content of the digital content file, the file access control mechanism including a license functions mechanism including a license monitor and control mechanism, an adaptive fingerprint security mechanism, and a license control utility, including a graphical user interface, and a dynamic license database associated with the digital content file for storing information controlling operations of the file access control mechanism and license information controlling licensed use of the digital content, comprising the steps of
    in the user system, and by operation of the file access control mechanism
        generating a purchase request for a license containing user system information wherein the purchase request includes system fingerprint information and financial information relating to the purchase of a license, and
        providing the request an order processing system,
    in the order processing system,
        generating an order identification and authorization for a license, and
        providing the order identification and authorization and the purchase request to a product configuration and order database containing at least one license management database associated with the digital content file and containing license information for controlling use of the digital content file in compliance with a license defined by the license information, and
    in the product configuration and order database,
        reading the license management database corresponding to the digital content file and generating license information defining a license for use of the digital content in the user system,
        providing the license information defining a license for use of the digital content in the user system to the user system, and
    in the user system, and by operation of the file access control mechanism,
        writing the license information into the dynamic license database to define a license for use of the digital content in the user system.

32. The method of claim 31 for providing a license for use of digital content in a digital content file residing in a user system wherein the digital content file includes an embedded file access control mechanism for controlling the licensed use of digital content of the digital content file, further comprising the step of:
    in the product configuration and order database,
        generating a license record of the order identifier and license information provided to the user system.

* * * * *